(12) United States Patent
Galal

(10) Patent No.: US 12,388,646 B2
(45) Date of Patent: Aug. 12, 2025

(54) SECURITY REGISTRATION AND AUTHENTICATION SYSTEMS AND METHODS FOR EXTENDING OpenID SECURITY STANDARDS FOR REGISTRATION OF OpenID CLIENT DEVICES FOR PASSKEY AUTHENTICATION

(71) Applicant: Amwal Tech Inc., Wilmington, DE (US)

(72) Inventor: Sameh Galal, Barcelona (ES)

(73) Assignee: AMWAL TECH INC., Wilmington, DE (US)

( * ) Notice: Subject to any disclaimer, the term of this patent is extended or adjusted under 35 U.S.C. 154(b) by 146 days.

(21) Appl. No.: 18/379,466

(22) Filed: Oct. 12, 2023

(65) Prior Publication Data

US 2025/0125965 A1    Apr. 17, 2025

(51) Int. Cl.
*H04L 9/32* (2006.01)
(52) U.S. Cl.
CPC .......... *H04L 9/3226* (2013.01); *H04L 9/3213* (2013.01); *H04L 9/3247* (2013.01); *H04L 9/3271* (2013.01)
(58) Field of Classification Search
None
See application file for complete search history.

(56) References Cited

U.S. PATENT DOCUMENTS

| | | | | |
|---|---|---|---|---|
| 11,669,805 | B2* | 6/2023 | Sundaram | G06Q 30/0601 726/8 |
| 12,278,914 | B1* | 4/2025 | Camacho | H04L 9/3268 |
| 2023/0275893 | A1* | 8/2023 | Sharma | H04L 63/0807 726/9 |
| 2024/0113886 | A1* | 4/2024 | Bhandarkar | H04L 9/0825 |
| 2024/0323686 | A1* | 9/2024 | Kumar | H04L 9/088 |
| 2025/0071104 | A1* | 2/2025 | Kumar | H04L 63/0815 |
| 2025/0094140 | A1* | 3/2025 | Rajendran | G06F 8/36 |

FOREIGN PATENT DOCUMENTS

WO    WO-2025075926 A1 *    4/2025    ......... H04L 63/0815

* cited by examiner

*Primary Examiner* — Jeffrey R Swearingen
(74) *Attorney, Agent, or Firm* — MARSHALL, GERSTEIN & BORUN LLP

(57) ABSTRACT

Security registration and authentication systems and methods are disclosed herein for extending OpenID security standards for registration of OpenID client devices for passkey authentication. A client device comprises client frontend application (app). A registration and authentication server comprises a client backend app for receiving an authorization request of the client device comprising a prompt parameter, and implementing one of: (a) a secure registration algorithm if the prompt parameter defines a create value; or (b) an authentication algorithm if the prompt parameter does not define the create value. The security registration and authentication systems and methods provide an authentication token to the client device, the authentication token authenticating the client device to initiate a secure session with a secure resource on a computer network.

19 Claims, 10 Drawing Sheets

(iOS Registration Example)

(iOS Registration Example)

(Android Registration Example)

(Web Registration Example)

(iOS Authentication Example)

(Android Authentication Example)

```
600 → {
         "publicKey": {
           "rp": {
             "name": "{org-name}",
             "id": "{org-name}.accounts.justpass.me"
           },
           "user": {
             "name": "{username}",
             "id": "{userid}",
             "displayName": "{username} For {org-name}"
           },
           "challenge": "{random-generated-challenge}",
           "pubkeyCredParams": [ ...
           ]
         }
       }
```

(Example Data Payload For Passkey Registration)

FIG. 6A

```
650 → {
         "publicKey": {
             "challenge": "{random-generated-challenge}",
             "rpId": "{org-name}.accounts.justpass.me",
             "allowcredentials": []
         }
       }
```

(Example Data Payload For Passkey Authentication)

FIG. 6B

SECURITY REGISTRATION AND AUTHENTICATION SYSTEMS AND METHODS FOR EXTENDING OpenID SECURITY STANDARDS FOR REGISTRATION OF OpenID CLIENT DEVICES FOR PASSKEY AUTHENTICATION

FIELD

The present disclosure generally relates to security registration and authentication system and methods, and more particularly to, security registration and authentication systems and methods for extending OpenID security standards for registration of OpenID client devices for passkey authentication.

BACKGROUND

Passkeys are relatively new technology that provide a new type of login credential that removes the need for passwords. Passkey based authentication requires either biometric authentication (e.g., such as a fingerprint or facial recognition) or a security key-based authentication (e.g., such as a PIN or swipe pattern) for access to secure resources.

Existing passkey identity providers fail to provide a secure and effective solution for migrating existing customers and either rely on independent verification of the users (for example, verifying phone number or email by sending a onetime code, such as a one-time password (OTP)). Additionally, traditional OpenID providers currently operate as completely separate and independent identity providers with respect to passkey registration, with OpenID registration as implemented by OpenID providers not tightly coupled with the services that use them for authentication. These conventional approaches have limitations when a given system uses, for example, a username that can't be verified using this method. Also this approach is limited when multi-factor authentication (e.g., two-factor authentication) is required to register the user for passkeys.

Moreover, these issues are exacerbated for mobile implementations, where the current OpenID standard is limited and cannot be used to provide passkey authentication for mobile apps because it limits its application to the use of web views (embedded mobile browsers), which fails to support passkey authentication.

For the foregoing reasons, there is a need for security registration and authentication systems and methods for extending OpenID security standards for registration of OpenID client devices for passkey authentication, as further described herein.

SUMMARY

A passkey is a scoped public-key based credential that can be used for authentication, without a password, for web or mobile apps based on the Web Authentication (WebAuthn) under the Fast IDentity Online (FIDO) Alliance standard. A passkey can be managed by an authenticator implemented by a given operating system or a given web browser, and, in some implementations, can be confined into a single physical device such as a universal serial bus (USB) security key.

The passkey standard uses two security algorithms (also referred to as ceremonies), which include registration for passkey provisioning and authentication for passkey authentication, e.g., logging in to a secure resource. During the registration algorithm or ceremony, a client authenticator requests user for permission (e.g., using biometric verification) to create a pair of asymmetric cryptographic keys (e.g., a private key and public key) scoped for the current website. After creation, the private key, is saved on the client device in a secure enclave or otherwise memory of the client device. A public key is sent to the authentication server (e.g., a Passkey Service Provider Backend) along with a server originated digital challenge signed with the private key. The public key is also saved on a server database for future reference.

During the authentication algorithm or ceremony, the server sends a randomly generated digital challenge to a client computing device, and a client authenticator determines whether the client device has permission (e.g., by using biometric verification) to access and use the private key scoped to the given website to sign the challenge. The signed challenge is decrypted using the server stored public key for the user. If the decoded challenge matches the generated challenge, the client device of the user is authenticated and allowed to access a secured resource (e.g., a secured online website).

Passkeys have been adopted by most well-known web browsers (e.g., the GOOGLE CHROME web browser, the FIREFOX web browser, etc.) and operating systems (e.g., the MICROSOFT WINDOWS operating system, the Apple macOS and iOS operating systems, and the GOOGLE ANDROID operating system). However, current passkey registration and authentication exposes security vulnerabilities and inefficiencies. For example, existing passkey vendors implement proprietary application programming interfaces(s) (APIs) for frontend and backend integration for the provision of passkeys. However, such proprietary API implementations are independent of an OpenID connection client and depend on email verification via one-time passwords (OTPs). Second such systems fail to support any mobile offering or provide 2-factor authentication or non-email-based usernames.

The security registration and authentication systems and methods disclosed herein solve these problems by implementation of an efficient and streamlined network-based algorithm for managing passkey registration and authentication with an end-to-end secure algorithm across a computer network. The disclosed security registration and authentication systems and methods allow for migration of existing user security accounts and related secure information (e.g., which may rely on traditional password protection) to passkey security via a secure end-to-end system.

Traditionally, a user desiring to migrate from a registered username and password implementation for security access of one service, would be required to migrate to a passkey based implementation needs to verify his or her identity using his or her existing username and password. The user is then required to securely instruct a passkey based service to allow the user to register his or her passkey. Such migration, however, includes multiple requests of a multi-factor authentication scheme. This not only exposes underlying computing devices to increase security risks (because each of the multiple requests are susceptible to a cyber-attack), but it also uses increased computational resources, of multiple devices (e.g., client computing device and server (s)) to accomplish.

The disclosed security registration and authentication systems and methods solve this problem by extending the open ID protocol to handle secure registration to allow for a secure end-to-end registration and authentication platform. Generally, OpenID is an open standard and decentralized authentication protocol that allows users to be authenticated on a website using a third-party identity provider (IDP)

service. For example a user might sign in to a website using a third party account (e.g., a GMAIL or FACEBOOK account) for authentication purposes. When a user wants to login to a given website using the OpenID protocol, the website will redirect the user's client device to the third-party identity provider (IDP). The IDP will then prompt the user's client device to authenticate. Once the user's client device is authenticated, the IDP will generate an OpenID and send it back to the website. The website can then use this OpenID to authenticate the user's client device without needing to know their actual credentials.

Still further, the disclosed security registration and authentication systems and methods disclosed herein extend the OpenID standard in various implementations to support passkeys for a given identity provider. For example, the disclosed security registration and authentication systems and methods include adding network semantics for passkey registration. In particular, OpenID defines a parameter (e.g., a "prompt" parameter) for actions with a set of predefined modes. A new mode defined as "create" is added to signal to the passkey provider that the user is allowed to register. A database or otherwise memory stores user information and interacts with an OpenID existing platform. In this way, disclosed security registration and authentication systems and methods provides a software-as-a-service (SaaS) platform that acts as wrapper around OpenID to extend OpenID's existing functionality.

The disclosed security registration and authentication systems and methods also provide enhanced security by security the prompt parameter. For example, to secure the prompt parameter, a prompt mode is protected against forgeries and a request to register a user is required to be signed and verified as actually sent from an authentic OpenID client device (e.g., a computing device). In one implementation, a shared OpenID client secret value is used to sign authorization request parameter(s) and may be added as a new request parameter (e.g., a signature parameter) to be validated by a client backend application. The client secret value may be looked up based on a client ID of the client device (as identified in the request) to verify the signature.

In a second implementation to protect the prompt mode against forgeries and to authentic the OpenID client device, an OpenID request param with a signed request object is passed as JavaScript Object Notation (JSON) web token (JWT) using a private key. The private key could be an asymmetric key associated with a public key for an OpenID client previously registered with a client backend application, PSPB, or otherwise server.

As a further example, the security registration and authentication systems and methods disclosed herein provide an end-to-end registration process that provides enhanced security compared to conventional registration. That is, registration is completely controlled by a client backend app, where passkeys can be used for registration and login as an alternative form of multi-factor registration and authentication, but where the login and verification is controlled by the client backend app with requiring the multiple back-and-forth communication and data verification by a user. This provides enhanced security over conventional systems. In addition, the security registration and authentication systems and methods disclosed herein eliminates conventional multi-factor authentication after the first registration.

As a further example, security registration and authentication systems and methods disclosed herein support new browser-less mobile implementations (e.g., implemented on mobile operating systems, such as APPLE IOS and/or GOOGLE Android) for registering and authenticating passkeys for mobile devices. In such implementations, a new request header in a given OpenID authorization request is added. By contrast, in traditional OpenID flow, a user is redirected using a browser to the identity provider to perform authentication and is redirected back. Specifically, OAuth 2.0, the underlying protocol of OpenID connect, is limited because it allows OAuth 2.0 authorization requests from native apps to only be made through external user-agents, primarily the user's browser as implemented on a given mobile device. For passkeys, native mobile operating systems and their related software development kits (SDKs), passkey implementations don't work in embedded web views (e.g., for web browsers on mobile devices). Additionally the scoping of passkeys works differently through mobile app-to-website association using well-known files hosted on the website. The security registration and authentication systems and methods disclosed herein overcome these limitations by supporting mobile operating systems and/or their SDK's, by adding a new header field in the authorization request to indicate if this is a request for a mobile app. In the case of mobile app, a passkey provider returns the FIDO challenge in a data payload (e.g., a JSON formatted data payload), which is used by the native mobile operating system's SDK. If a mobile app is not used, redirection flow provided by a web browser.

In some aspects, the techniques described herein relate to a security registration and authentication system configured to extend OpenID security standards for registration of OpenID client devices for passkey authentication, the security registration and authentication system including: a registration and authentication server including a server memory and a server processor; a set of client computing instructions including a client frontend application (app) configured for storage on a client memory of a client device, and to be executed by a client processor of the client device; and a set of server computing instructions including a client backend app configured for storage on the server memory, and the set of server computing instructions configured for networked communication via a computer network with the set of client computing instructions, wherein the set of server computing instructions of the client backend app, when executed by the server processor, causes the server processor to: receive an authorization request of the client device including a prompt parameter, and implementing one of: (a) a secure registration algorithm if the prompt parameter defines a create value; or (b) an authentication algorithm if the prompt parameter does not define the create value, wherein the secure registration algorithm includes: verifying a digital signature of the client device, detecting a type of the client device, invoking passkey registration, according to the type of the client device, to generate a passkey for the client device, the passkey including a public-private key pair having a public key and a private key, and the passkey registration including sending a request to register a user of the client device at a passkey service provider backend (PSPB), saving, in a memory of the PSPB, the public key, and saving, in the client memory, the private key, wherein the authentication algorithm includes: detecting the type of the client device, invoking a passkey login, according to the type of the client device, including invoking the PSPB to send a security challenge and to receive in response a signed security challenge from the client device, the signed security challenge including the security challenge signed with the private key, and authenticating the client device by verifying the signed security challenge with the public key, and provide an authentication token to the client device, the authentication token authenticating the client device to initiate a secure session with a secure resource on the computer network.

In some aspects, the techniques described herein relate to a security registration and authentication system, wherein the type of client device is a mobile client device implementing a native mobile operating system (OS) configured to execute or interact with the client frontend app, the set of client computing instructions of the client frontend app generated by a native software development kit (SDK) corresponding to the native mobile OS, and wherein the secure registration algorithm further includes: receiving from the client frontend app a platform header that identifies the client device as a type of mobile client device, generating and submitting a redirect request to the PSPB, the redirect request including the platform header, wherein the redirect request invokes the PSPB to send a passkey generation request to the client frontend app, wherein the client frontend app generates the passkey using a passkey generator-and-authenticator as implemented through the native SDK of the native mobile OS, and wherein the client frontend app transmits the public key to the PSPB; wherein the authentication algorithm further includes: receiving from the client frontend app a platform header that identifies the client device as a type of mobile client device, generating and submitting a redirect request to the PSPB, the redirect request including the platform header, wherein the redirect request invokes the PSPB to send the security challenge to the client frontend app, wherein the client frontend authenticates the user by signing the challenge using the private key generate by the passkey generator-and-authenticator as implemented through the native SDK of the native mobile OS, wherein the client frontend app transmits the signed security challenge to the PSPB, and wherein the signed security challenge is verified by the public key as generated by the passkey generator-and-authenticator as implemented through the native SDK of the native mobile OS.

In some aspects, the techniques described herein relate to a security registration and authentication system, wherein the passkey generator-and-authenticator collects biometric data of the user, and wherein a first set of biometric data of the user is used to generate the passkey during the execution of the secure registration algorithm, and wherein a second set of biometric data is used to authenticate the user during execution of the authentication algorithm.

In some aspects, the techniques described herein relate to a security registration and authentication system, wherein the type of client device is a computing device implementing a web browser.

In some aspects, the techniques described herein relate to a security registration and authentication system, wherein the authorization request of the client device including the prompt parameter is secured against forgeries by: generating, by the client backend app, a signature value by signing the authorization request with a shared client secret value as shared between the client backend app and PSPB, receiving, by the PSPB, the authorization request, looking up, by the PSPB, a client identifier (ID) of the client device corresponding to the client backend app, and verifying, by the PSPB, the signature value with the shared client secret value.

In some aspects, the techniques described herein relate to a security registration and authentication system, wherein the authorization request of the client device including the prompt parameter is secured against forgeries by: generating a signed request object based on the prompt parameter, passing the signed request object as a JavaScript object notation (JSON) web token using a second private key, wherein the second private key includes an asymmetric key corresponding to a second public key of the client backend app, and wherein the second public key is registered with and is accessible to the PSPB for verifying the JSON web token.

In some aspects, the techniques described herein relate to a security registration and authentication method for extending OpenID security standards for registration of OpenID client devices for passkey authentication, the security registration and authentication method including: receiving, by a client backend app executing on a registration and authentication server, server memory, an authorization request including a prompt parameter from a client device, wherein client device includes client memory storing a set of client computing instructions including a client frontend application (app) executing on a client processor of the client device, and wherein the authorization request is received via a computer network and causes the client backend app to implement one of: (a) a secure registration algorithm if the prompt parameter defines a create value; or (b) an authentication algorithm if the prompt parameter does not define the create value, wherein the secure registration algorithm includes: verifying a digital signature of the client device, detecting a type of the client device, invoking passkey registration, according to the type of the client device, to generate a passkey for the client device, the passkey including a public-private key pair having a public key and a private key, and the passkey registration including sending a request to register a user of the client device at a passkey service provider backend (PSPB), saving, in a memory of the PSPB, the public key, and saving, in the client memory, the private key, wherein the authentication algorithm includes: detecting the type of the client device, invoking a passkey login, according to the type of the client device, including invoking the PSPB to send a security challenge and to receive in response a signed security challenge from the client device, the signed security challenge including the security challenge signed with the private key, and authenticating the client device by verifying the signed security challenge with the public key, and providing an authentication token to the client device, the authentication token authenticating the client device to initiate a secure session with a secure resource on the computer network.

In some aspects, the techniques described herein relate to a security registration and authentication method, wherein the type of client device is a mobile client device implementing a native mobile operating system (OS) configured to execute or interact with the client frontend app, the set of client computing instructions of the client frontend app generated by a native software development kit (SDK) corresponding to the native mobile OS, and wherein the secure registration algorithm further includes: receiving from the client frontend app a platform header that identifies the client device as a type of mobile client device, generate and submit a redirect request to the PSPB, the redirect request including the platform header, wherein the redirect request invokes the PSPB to send a passkey generation request to the client frontend app, wherein the client frontend app generates the passkey using a passkey generator-and-authenticator as implemented through the native SDK of the native mobile OS, and wherein the client frontend app transmits the public key to the PSPB; wherein the authentication algorithm further includes: receiving from the client frontend app a platform header that identifies the client device as a type of mobile client device, generate and submit a redirect request to the PSPB, the redirect request including the platform header, wherein the redirect request invokes the PSPB to send the security challenge to the client frontend app, wherein the client frontend authenticates the user by signing the challenge using the private key generated by the passkey generator-and-authenticator as implemented through the native SDK of the native mobile OS, wherein the client frontend app transmits the signed security challenge to the PSPB, and wherein the signed security challenge is verified by the public key as generated by the passkey generator-and-authenticator as implemented through the native SDK of the native mobile OS.

In some aspects, the techniques described herein relate to a security registration and authentication method, wherein the passkey generator-and-authenticator collects biometric data of the user, and wherein a first set of biometric data of the user is used to generate the passkey during the execution of the secure registration algorithm, and wherein a second set of biometric data is used to authenticate the user during execution of the authentication algorithm.

In some aspects, the techniques described herein relate to a security registration and authentication method, wherein the type of client device is a computing device implementing a web browser.

In some aspects, the techniques described herein relate to a security registration and authentication method, wherein the authorization request of the client device including the prompt parameter is secured against forgeries by: generating, by the client backend app, a signature value by signing the authorization request with a shared client secret value as shared between the client backend app and PSPB, receiving, by the PSPB, the authorization request, looking up, by the PSPB, a client identifier (ID) of the client device corresponding to the client backend app, and verifying, by the PSPB, the signature value with the shared client secret value.

In some aspects, the techniques described herein relate to a security registration and authentication method, wherein the authorization request of the client device including the prompt parameter is secured against forgeries by: generating a signed request object based on the prompt parameter, passing the signed request object as a JavaScript object notation (JSON) web token using a second private key, wherein the second private key includes an asymmetric key corresponding to a second public key of the client backend app, and wherein the second public key is registered with and is accessible to the PSPB for verifying the JSON web token.

In some aspects, the techniques described herein relate to a tangible, non-transitory computer-readable medium storing instructions of a client backend application (app) for extending OpenID security standards for registration of OpenID client devices for passkey authentication, that when executed by one or more processors cause the one or more processors to: receive, by a client backend app executing on a registration and authentication server, server memory, an authorization request including a prompt parameter from a client device, wherein client device includes client memory storing a set of client computing instructions including a client frontend application (app) executing on a client processor of the client device, and wherein the authorization request is received via a computer network and causes the client backend app to implement one of: (a) a secure registration algorithm if the prompt parameter defines a create value; or (b) an authentication algorithm if the prompt parameter does not define the create value, wherein the secure registration algorithm includes: verifying a digital signature of the client device, detecting a type of the client device, invoking passkey registration, according to the type of the client device, to generate a passkey for the client device, the passkey including a public-private key pair having a public key and a private key, and the passkey registration including sending a request to register a user of the client device at a passkey service provider backend (PSPB), saving, in a memory of the PSPB, the public key, and saving, in the client memory, the private key, wherein the authentication algorithm includes: detecting the type of the client device, invoking a passkey login, according to the type of the client device, including invoking the PSPB to send a security challenge and to receive in response a signed security challenge from the client device, the signed security challenge including the security challenge signed with the private key, and authenticating the client device by verifying the signed security challenge with the public key, and provide an authentication token to the client device, the authentication token authenticating the client device to initiate a secure session with a secure resource on the computer network.

In some aspects, the techniques described herein relate to a tangible, non-transitory computer-readable medium, wherein the type of client device is a mobile client device implementing a native mobile operating system (OS) configured to execute or interact with the client frontend app, the set of client computing instructions of the client frontend app generated by a native software development kit (SDK) corresponding to the native mobile OS, and wherein the secure registration algorithm further includes: receiving from the client frontend app a platform header that identifies the client device as a type of mobile client device, generating and submitting a redirect request to the PSPB, the redirect request including the platform header, wherein the redirect request invokes the PSPB to send a passkey generation request to the client frontend app, wherein the client frontend app generates the passkey using a passkey generator-and-authenticator as implemented through the native SDK of the native mobile OS, and wherein the client frontend app transmits the public key to the PSPB; wherein the authentication algorithm further includes: receiving from the client frontend app a platform header that identifies the client device as a type of mobile client device, generating and submitting a redirect request to the PSPB, the redirect request including the platform header, wherein the redirect request invokes the PSPB to send the security challenge to the client frontend app, wherein the client frontend authenticates the user by signing the challenge using the private key generated by the passkey generator-and-authenticator as implemented through the native SDK of the native mobile OS, wherein the client frontend app transmits the signed security challenge to the PSPB, and wherein the signed security challenge is verified by the public key as generated by the passkey generator-and-authenticator as implemented through the native SDK of the native mobile OS.

In some aspects, the techniques described herein relate to a tangible, non-transitory computer-readable medium, wherein the passkey generator-and-authenticator collects biometric data of the user, and wherein a first set of biometric data of the user is used to generate the passkey during the execution of the secure registration algorithm, and wherein a second set of biometric data is used to authenticate the user during execution of the authentication algorithm.

In some aspects, the techniques described herein relate to a tangible, non-transitory computer-readable medium, wherein the type of client device is a computing device implementing a web browser.

In some aspects, the techniques described herein relate to a tangible, non-transitory computer-readable medium, wherein the authorization request of the client device including the prompt parameter is secured against forgeries by: generating, by the client backend app, a signature value by signing the authorization request with a shared client secret value as shared between the client backend app and PSPB, receiving, by the PSPB, the authorization request, looking up, by the PSPB, a client identifier (ID) of the client device corresponding to the client backend app, and verifying, by the PSPB, the signature value with the shared client secret value.

In some aspects, the techniques described herein relate to a tangible, non-transitory computer-readable medium, wherein the authorization request of the client device including the prompt parameter is secured against forgeries by: generating a signed request object based on the prompt parameter, passing the signed request object as a JavaScript object notation (JSON) web token using a second private key, wherein the second private key includes an asymmetric key corresponding to a second public key of the client backend application, and wherein the second public key is registered with and is accessible to the PSPB for verifying the JSON web token.

In some aspects, the techniques described herein relate to a security registration and authentication system configured to extend OpenID security standards for registration of OpenID client devices for passkey authentication, the security registration and authentication system including: a registration and authentication server including a server memory and a server processor; a set of client computing instructions including a client frontend application (app) configured for storage on a client memory of a client device, and to be executed by a client processor of the client device, wherein a type of the client device is a mobile client device implementing a native mobile operating system (OS) configured to execute or interact with the client frontend app, the set of client computing instructions of the client frontend app generated by a native software development kit (SDK) corresponding to the native mobile OS; and a set of server computing instructions including a client backend app configured for storage on the server memory, and the set of server computing instructions configured for networked communication via a computer network with the set of client computing instructions, wherein the set of server computing instructions of the client backend app, when executed by the server processor, causes the server processor to: receive an authorization request of the client device including a prompt parameter, and implementing one of: (a) a secure registration algorithm if the prompt parameter defines a create value; or (b) an authentication algorithm if the prompt parameter does not define the create value, wherein the secure registration algorithm includes: verifying a digital signature of the client device, receiving from the client frontend app a platform header that identifies the client device as a type of mobile client device, detecting that the type of the client device is a mobile client device, invoking passkey registration, for the mobile client device, to generate a passkey for the client device, the passkey including a public-private key pair having a public key and a private key, and the passkey registration including sending a request to register a user of the client device at a passkey service provider backend (PSPB), wherein the passkey registration also includes generating and submitting a redirect request to the PSPB, the redirect request including the platform header, wherein the redirect request invokes the PSPB to send a security challenge to the client frontend app, wherein the client frontend app generates the passkey using a passkey generator-and-authenticator as implemented through the native SDK of the native mobile OS, wherein the client frontend app transmits the public key to the PSPB, saving, in a memory of the PSPB, the public key, and saving, in the client memory, the private key, wherein the authentication algorithm includes: receiving from the client frontend app a platform header that identifies the client device as a type of mobile client device, detecting that the type of the client device is a mobile client device, invoking a passkey login, for the mobile client device, including invoking the PSPB to send the security challenge and to receive in response a signed security challenge from the client device, the signed security challenge including the security challenge signed with the private key, wherein the passkey login also includes generating and submitting a redirect request to the PSPB, the redirect request including the platform header, wherein the redirect request invokes the PSPB to send a passkey public key authentication request to the client frontend app, wherein the client frontend authenticates the user by signing the challenge using the private key generated by the passkey generator-and-authenticator as implemented through the native SDK of the native mobile OS, and wherein the client frontend app transmits the signed security challenge to the PSPB, and authenticating the client device by verifying the signed security challenge with the public key, wherein the signed security challenge is verified by the public key as generated by the passkey generator-and-authenticator as implemented through the native SDK of the native mobile OS, and providing an authentication token to the client device, the authentication token authenticating the client device to initiate a secure session with a secure resource on the computer network.

The present disclosure relates to improvements to other technologies or technical fields at least because the present disclosure describes or introduces improvements to computing devices in the network security and authentication computing field, security of a computing device (e.g., a mobile device) is improved by extension of OpenID security standards for registration of OpenID client devices (e.g., mobile devices) for passkey authentication. The security enhancement improves the computing device by requiring fewer security transmissions be sent across a computer network (e.g., the Internet). Such implementation reduces the opportunity for such security transmissions to be intercepted and hacked. That is, the present disclosure describes security registration and authentication systems and methods for secure registration and authentication of passkeys, where passkey registration and authentication can occur natively via the operating system of a client device with needing an additional backend security authentication procedures that can require additional transmissions sent across a network (e.g., the Internet) and be intercepted.

In addition, client devices (e.g., mobile devices) are further improved because they can operate with fewer screens or graphical user interfaces (GUIs), instead relying on existing built-in or otherwise native screens of an operating system to generate passkeys or other related information. Further, use of built-in and/o native screens or GUIs allow implementation of passkey registration and authentication without having to use or switch between native and proprietary screens or GUIs, which reduces processing and memory requirements of underlying computing device. In addition, the ability of the system to operate without storage of additional screens or GUIs (and related images or text thereof) allows the underlying system to store and/or process a smaller set of information, including natively by the underlying operating system. This results in a performance increase to the underlying operating system of the computing device (e.g., mobile device) as a whole because the limited or smaller data size images require less storage memory and/or processing resources to store, process, and/ or otherwise manipulate the underlying screens or GUIs of the system as a whole.

In addition, the present disclosure includes specific features other than what is well-understood, routine, conventional activity in the field, and that add unconventional steps that confine the claim to a particular useful application, e.g., security registration and authentication systems and methods for extending OpenID security standards for registration of OpenID client devices for passkey authentication as described herein.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein:

FIG. 6A illustrates an example data payload for passkey registration of a mobile device via a computer network, in accordance with various aspects disclosed herein.

FIG. 6B illustrates an example data payload for passkey authentication of a mobile device via a computer network, in accordance with various aspects disclosed herein.

The Figures depict preferred aspects for purposes of illustration only. Alternative aspects of the systems and methods illustrated herein may be employed without departing from the principles of the invention described herein.

DETAILED DESCRIPTION OF THE INVENTION

Figure 1:
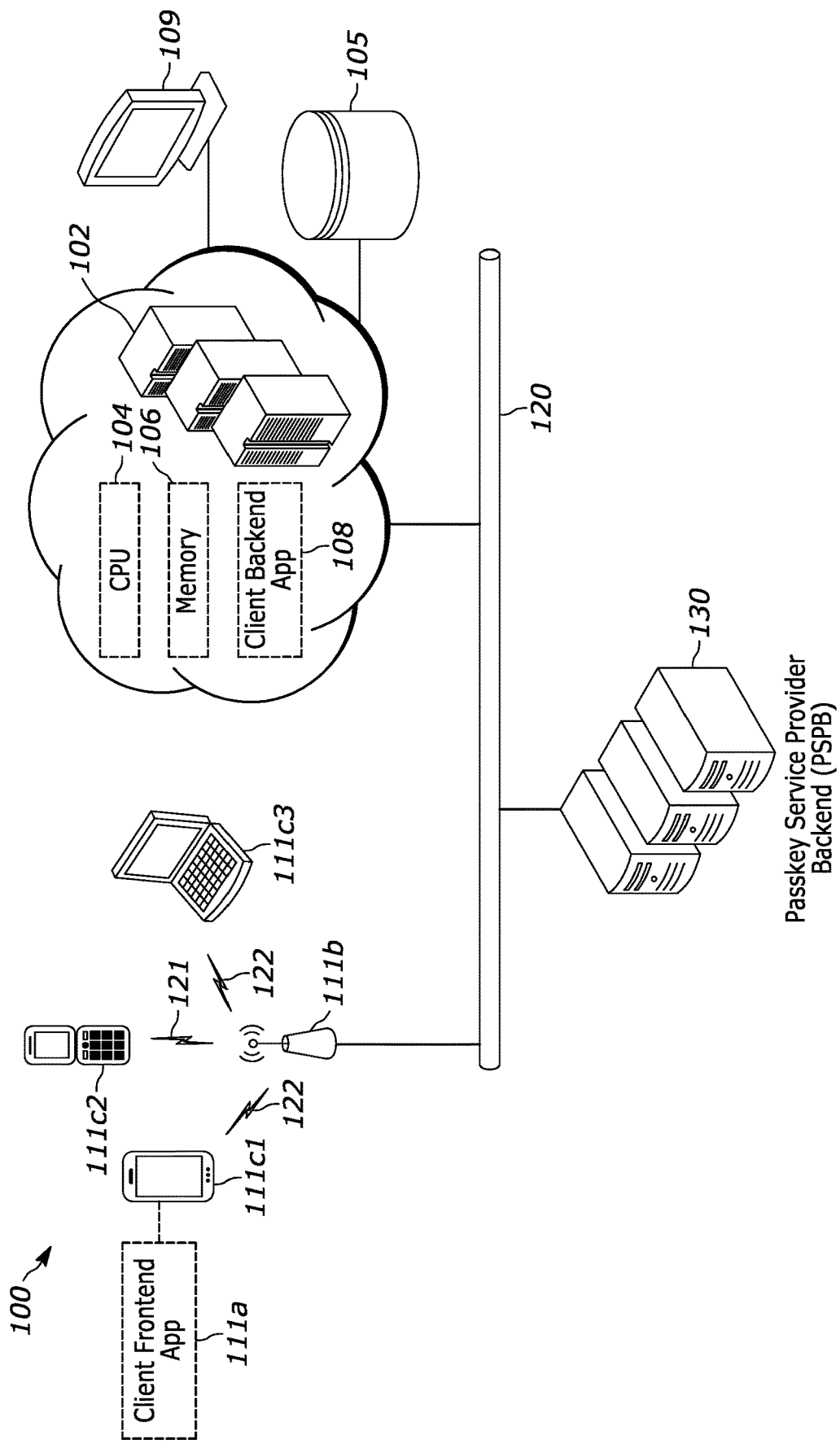
FIG. 1 illustrates an example security registration and authentication system configured to extend OpenID security standards for registration of OpenID client devices for passkey authentication, in accordance with various aspects disclosed herein.

FIG. 1 illustrates an example security registration and authentication system 100 configured to extend OpenID security standards for registration of OpenID client devices for passkey authentication, in accordance with various aspects disclosed herein. As shown in the example of FIG. 1, security registration and authentication system 100 includes server(s) 102, which may comprise one or more computer servers. In various aspects server(s) 102 comprise multiple servers, which may comprise multiple, redundant, or replicated servers as part of a server farm. In still further aspects, server(s) 102 may be implemented as cloud-based servers, such as a cloud-based computing platform. For example, server(s) 102 may be any one or more cloud-based platform(s) such as MICROSOFT AZURE, AMAZON AWS, or the like. Server(s) 102 may include a processor 104 (e.g., a central processing unit (CPU)), which may comprise one or more processors as manufactured or offered by INTEL, AMD, or other server processor or computer processor manufacturers, or the like.

Server(s) 102 may also comprise computer memory 106. Memory 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memory 106 may store an operating system (OS) (e.g., Microsoft Windows, Linux, UNIX, etc.) capable of facilitating the functionalities, apps, methods, or other software as discussed herein. Memory 106 may also store a client backend application (app) 108, as described herein. In addition, memory 106 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. It should be appreciated that one or more application(s) may be executed by the processor 104.

The processor 104 may be connected to the memory 106 via a computer bus responsible for transmitting electronic data, data packets, or otherwise electronic signals to and from the processor 104 and memory 106 in order to implement or perform machine-readable or otherwise computing instructions, methods, processes, elements or limitations, as illustrated, depicted, or described for the various flowcharts, illustrations, diagrams, figures, and/or other disclosure herein.

Processor 104 may interface with memory 106 via the computer bus to execute an operating system (OS), such as an operating system provided by or based on MICROSOFT, LINUX, or the like. Processor 104 may also interface with the memory 106 via the computer bus to create, read, update, delete, or otherwise access or interact with the data stored in memory 106 and/or the database 105 (e.g., a relational database, such as Oracle, DB2, MySQL, or a NoSQL based database, such as MongoDB). The data stored in memory 106 and/or database 105 may include all or part of any of the data or information described herein, including, for example, security data, registration data, passkey data, user data, or the like, or as otherwise described herein.

Server(s) 102 may further include a communication component configured to communicate (e.g., send and receive) data via one or more external/network port(s) to one or more networks or local terminals, such as computer network 120 and/or terminal 109 (for rendering or visualizing) described herein. In some aspects, server(s) 102 may include a client-server platform technology such as ASP.NET, JAVA J2EE, RUBY ON RAILS, NODE.JS, a web service or online API, responsive for receiving and responding to electronic requests. The server(s) 102 may implement the client-server platform technology that may interact, via the computer bus, with the memories(s) 106 (including the applications(s), component(s), API(s), data, etc. stored therein) and/or database 105 to implement or perform machine readable or computing instructions, methods, processes, elements or limitations, as illustrated, depicted, or described for the various flowcharts, illustrations, diagrams, figures, and/or other disclosure herein.

In various aspects, the server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some aspects, computer network 120 may comprise a private network or local area network (LAN). Additionally, or alternatively, computer network 120 may comprise a public network such as the Internet.

Server(s) 102 may further include or implement an operator interface configured to present information to an administrator or operator and/or receive inputs from the administrator or operator. As shown in FIG. 1, an operator interface may provide a display screen (e.g., via terminal 109). Server(s) 102 may also provide I/O components (e.g., ports, capacitive or resistive touch sensitive input panels, keys, buttons, lights, LEDs), which may be directly accessible via, or attached to, server(s) 102 or may be indirectly accessible via or attached to terminal 109. According to some aspects, an administrator or operator may access the server(s) 102 via terminal 109 to review information, make changes, and/or perform other functions.

In some aspects, server(s) 102 may perform the functionalities as discussed herein as part of a "cloud" network or may otherwise communicate with other hardware or software components within the cloud to send, retrieve, or otherwise analyze data or information described herein.

In general, a computer program or computer based software application, such as client backend app 108 or client frontend app 111a (or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by a processor 104 (e.g., processor 104 working in connection with the respective operating system in memory 106) to facilitate, implement, or perform the machine readable instructions, methods, processes, elements or limitations, as illustrated, depicted, or described for the various flowcharts, illustrations, diagrams, figures, and/or other disclosure herein. Program code or computing instructions, as describe herein, may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

As shown in FIG. 1, server(s) 102 are communicatively connected, via computer network 120 to one or more user computing devices 111c1-111c3 via base station 111b. In some aspects, base station 111b may comprise cellular base stations, such as cell towers, communicating to the one or more user computing devices 111c1-111c3 via wireless communications 121 based on any one or more of various mobile phone standards, including NMT, GSM, CDMA, UMMTS, LTE, 5G, or the like.

Additionally, or alternatively, base station 111b may comprise wireless routers, wireless switches, or other such wireless connection points communicating to the one or more user computing devices 111c1-111c3 via wireless communications 122 based on any one or more of various wireless standards, including by non-limiting example, IEEE 802.11a/b/c/g (WIFI), the BLUETOOTH standard, or the like.

Server(s) 102 and computing devices 111c1-111c3 are communicatively coupled, via computer network 120, to Passkey Server Provider Backend (PSPB) 130. PSPB 130 provides a passkey security and registration service that allows users to register, and then sign in with, a passkey across one or more of their respective devices using a biometric key and/or a security key. PSPB 130 may implement the standards, application programming interface(s) (API(s)), and/or software of the FIDO alliance. In some implementations, PSPB 130 may comprise server(s) (e.g., having processor(s) and computer memory) separate from server(s) 102 and communicatively coupled across computer network 120 . . . . Additionally, or alternatively, PSPB 130 may comprise the same server(s) as server(s) 102 and/or may be connected via a local network to server(s) 102.

Any of the one or more user computing devices 111c1-111c3 may comprise mobile devices and/or client devices for accessing and/or communications with server(s) 102 and/or PSPB 130 via computer network 120. In various aspects, user computing devices 111c1 and 111c2 provide examples of a mobile phone (e.g., a cellular phone), a tablet device, a personal data assistance (PDA), or the like, including, by non-limiting example, an APPLE IPHONE or IPAD device or a GOOGLE ANDROID based mobile phone or tablet. Computing device 113c3 provides an example of a computing device, such as personal computer having, which may implement an operating system such as a MICROSOFT WINDOWS or APPLE MACOS, or the like, and may be cable of executing a web browser for communication with server(s) 102 and/or PSPB 130 via computer network 120. Any of the one or more user computing devices 111c1-111c3 may comprise one or more processors and/or one or more memories for storing, implementing, or executing computing instructions or code, e.g., a mobile application, as described in various aspects herein.

As shown in FIG. 1, client frontend app 111a is stored locally on a memory of a user computing device (e.g., user computing device 111c1). That is, each of the user computing devices 111c1-111c3 may implement a client frontend application (app) 111a (e.g., as shown, by way of non-limiting example, for computing device 111c1). The client frontend app 111a comprises computing instructions configured for execution by a processor of a computing device (e.g., a processor of any one of computing devices 111c1-111c3). The client frontend app 111a may be implemented in a programming language for an operating system of a given client device, e.g., SWIFT or Objective-C for a computing device implementing APPLE IOS, Java for a computing device implementing the GOOGLE ANDROID operating system, JavaScript, HTML, CSS, and/or other web languages for an operating system capable of executing a web browser, such as GOOGLE CHROME or the like.

User computing devices 111c1-111c3 may comprise a wireless transceiver to receive and transmit wireless communications 121 and/or 122 to and from base station 111b. In various aspects, data or information, such as passkeys or related information, user information, data payloads, or other data or information as described herein, may be transmitted via computer network 120 to and from server(s) 102 and/or PSPB 130 for analysis, execution, reporting, and/or otherwise described herein.

Still further, each of the one or more user computer devices 111c1-111c3 may include a display screen for displaying graphics, images, text, passkey registration and authentication screens, and/or other such screens or information as described herein. In various aspects, graphics, images, text, screens, and/or other such visualizations or information may be received from server(s) 102 for display on the display screen of any one or more of user computer devices 111c1-111c3. Additionally, or alternatively, such graphics, images, text, screens, and/or other such visualizations or information may be rendered natively by an operating system of a computing device. Still further, a user computer device may comprise, implement, have access to, render, or otherwise expose, at least in part, an interface or a guided user interface (GUI) for displaying such graphics, images, text, screens, and/or other such visualizations or information, for example, as described herein.

In some aspects, computing instructions and/or applications executing at the server (e.g., server(s) 102), at a computing device (e.g., user computing device 111c1), and/or at PSBP 130 may be communicatively connected for security registration and authentication via extending OpenID security standards for registration of OpenID client devices for passkey authentication, including transmitting passkey information and/or other data as describe herein.

For example, one or more processors (e.g., processor 104) of server(s) 102 may be communicatively coupled to a mobile device via a computer network (e.g., computer network 120). In some aspects, as shown for FIG. 1, client backend app 108 may comprise a server app portion configured to execute on the one or more processors of the server (e.g., server(s) 102) and client frontend app 111a may comprise a client app portion configured to execute on one or more processors of a client device (e.g., any of one or more user computing devices 111c1-111c3). In such aspects, the server app portion (e.g., client backend app 108) is configured to communicate with the client app portion (e.g., client frontend app 111a), where one or both portions may communicate with PSPB 130 for implementing security registration and authentication as described herein.

Figure 2:
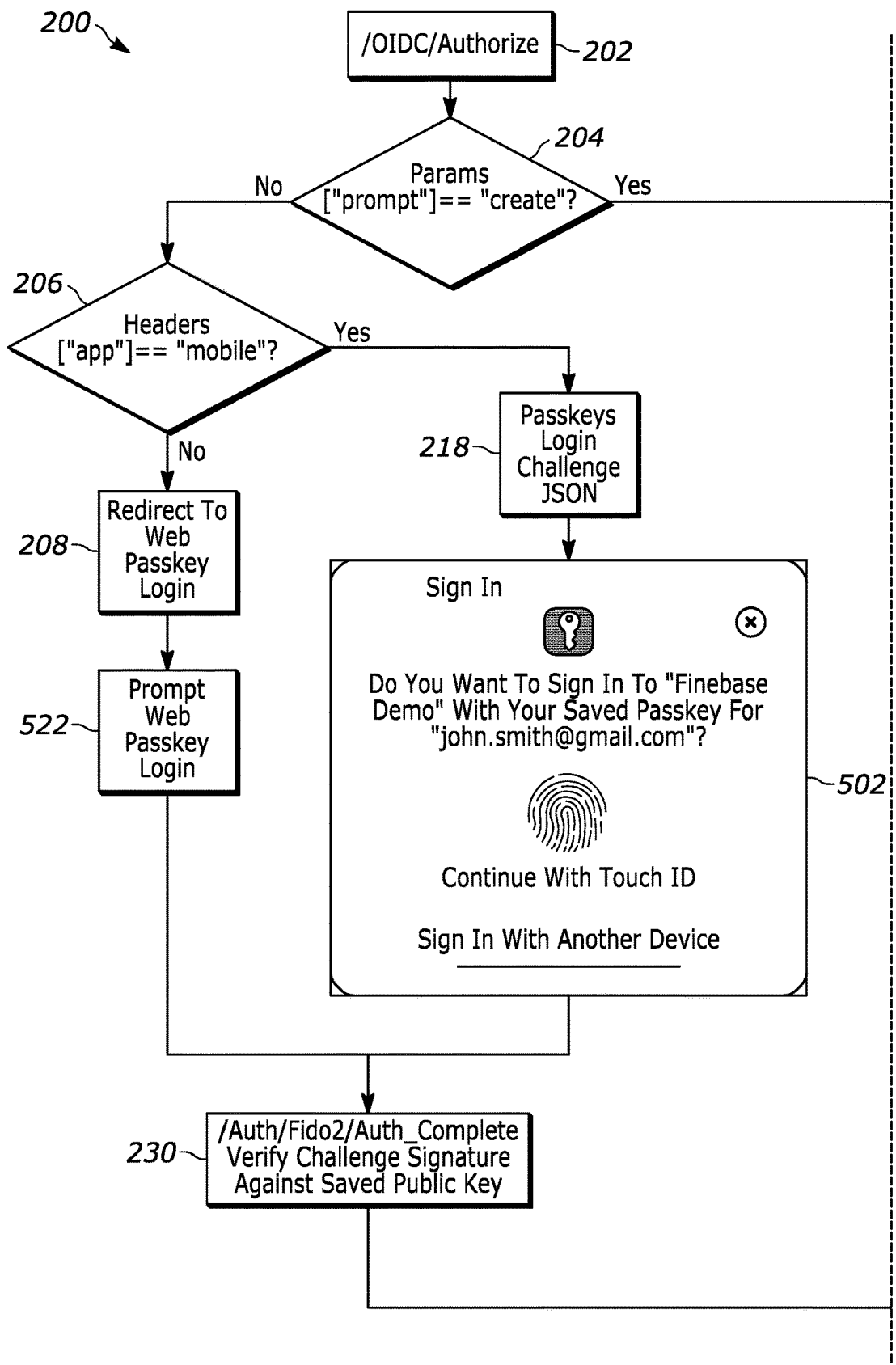
FIG. 2 illustrates an example security registration and authentication method for extending OpenID security standards for registration of OpenID client devices for passkey authentication, in accordance with various aspects disclosed herein.
Figure 2:
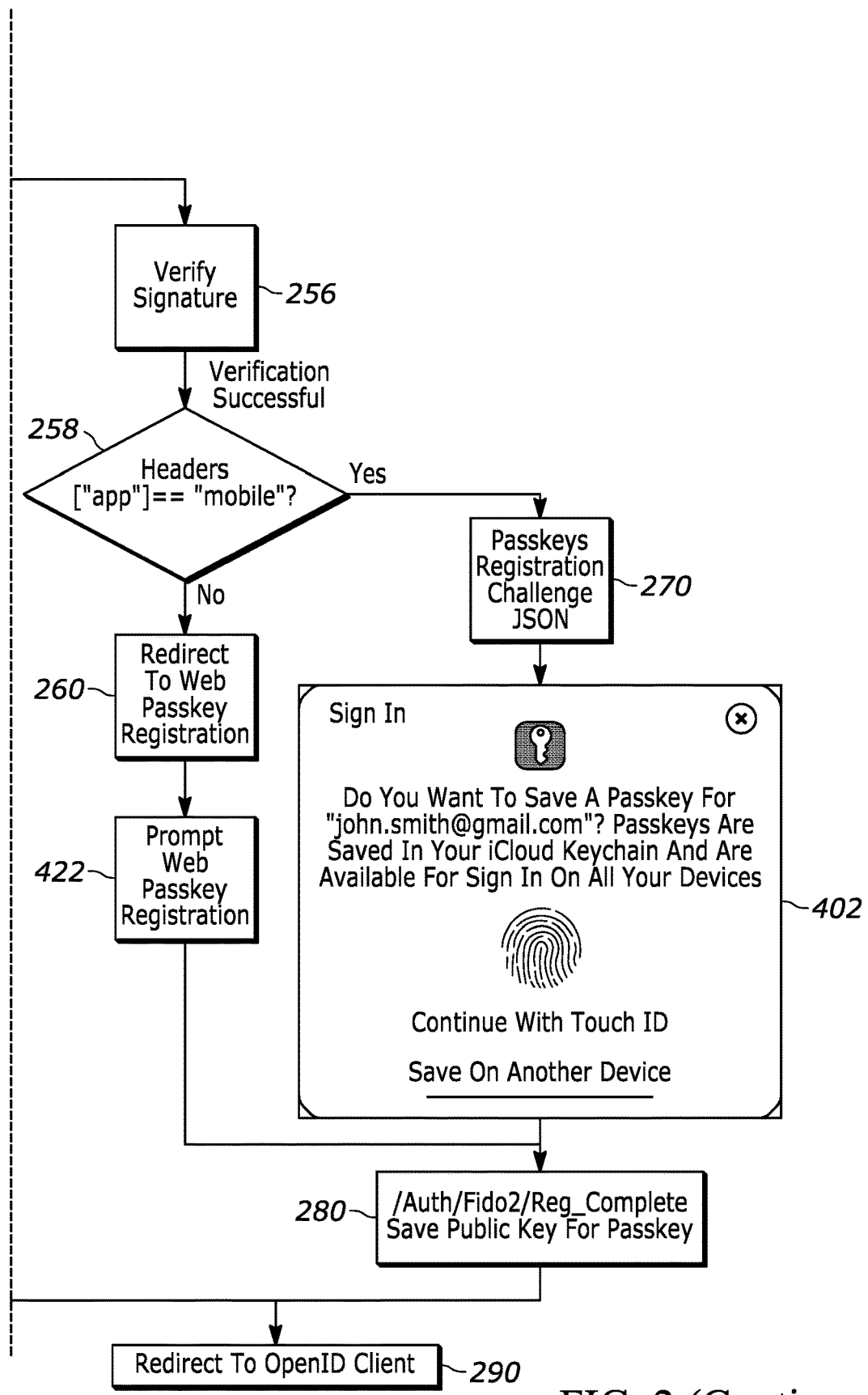

FIG. 2 illustrates an example security registration and authentication method 200 for extending OpenID security standards for registration of OpenID client devices for passkey authentication, in accordance with various aspects disclosed herein. Security registration and authentication method 200 provides passkey service or algorithms, implemented across mobile and web-based devices. Security registration and authentication method 200 can involve the interaction among three communication systems, the first of which can be a client device (e.g., a mobile device and its related software development kit (SDK) or a client device implementing a web browser graphic user interface (GUI), such as any of any of user computing device(s) 111c1-111c3. Additionally, a client backend (e.g., server(s) 102 implementing client backend app 108) can communicate with the client device. In various aspects, the client backend, and/or its application (e.g., client backend app 108), can be implemented a GOOGLE FIREBASE extension. Further, a passkey service provider backend (e.g., PSPB 130) can communicate with each of the client backend, and/or its application (e.g., client backend app 108), and the client device (e.g., computing device 111c1). Each of the client device, client backend, and/or its application (e.g., client backend app 108), can communicate amongst one another, e.g., over computer network 120, to implement and provide registration/authentication flow for passkeys for both mobile and web apps. Such registration/authentication flow is further demonstrated herein with respect to FIGS. 3A and 3B.

In various aspects, security registration and authentication method 200 may comprise computing instructions embodying an algorithm, or set of algorithms, for implementation at one or more of server(s) 102 (e.g., as part of client backend app 108), computing device 111c1, and/or PSPB 130. For example, in one implementation, server(s) 102 may comprise a registration and authentication server comprising a server memory (e.g., memory 106 and/or database 105) and a server processor (e.g., processor 104). The server may comprise code, such as client backend app 108, provided by the JUSTPASS.ME company, which may comprise computing instructions written in a program language such as JAVA, C #, C++, Go Lang, or the like.

A client frontend app (e.g., client frontend app 111a) may comprise code, such as set of client computing instructions configured for storage on a client memory (e.g., computer memory) of a client device (e.g., computing device 111c1), and configured to be executed by a client processor of the client device. The client frontend app may comprise code provided by the JUSTPASS.ME company, which may comprise mobile code (e.g., app code, such as Objective-C, SWIFT, or Java), or webpage and/or website code (e.g., HTML, JavaScript, CSS, or the like).

The server code (e.g., client backend app 108) may be configured for networked communication via a computer network (e.g., computer network 120) with the set of client computing instructions, e.g., client frontend app 111*a*. The set of server computing instructions of the client backend app, when executed by the server processor (e.g., bumper 104), may cause the server processor to implement security registration and authentication method 200. For example, with reference to security registration and authentication method 200, at block 202, client backend app 108 receives an authorization request of the client device A block 204 security registration and authentication method 200 comprises implementing, or determining to implement, one of: (a) a secure registration algorithm if the prompt parameter defines a create value; or (b) an authentication algorithm if the prompt parameter does not define the create value. The create value may be part of the prompt parameter(s) of the of the authorization request (e.g., an OpenID request or otherwise OIDC/authorize request).

With further reference to security registration and authentication method 200, at block 256, the security registration algorithm is implemented, where the prompt value defines or otherwise includes the create value, indicating that the registration algorithm is to be invoked. The secure registration algorithm may comprise verifying a digital signature of the client device (e.g., computing device 111*c*1). In various aspects, the authorization request (comprising the prompt parameter) is secured against forgeries. In one algorithm for securing the authorization request against forgeries, a signature value is generated by the client backend app (e.g., client backend app 108) by signing the authorization request with a shared client secret value as shared between the client backend app and PSPB (e.g., PSPB 130). The PSPB receives the authorization request and looks up a client identifier (ID) of the client device corresponding to the client backend app. The PSBB may then verify the signature value with the shared client secret value, and, thereby verify the authorization request.

Additionally, or alternatively, the authorization request (comprising the prompt parameter) may be secured against forgeries by generating a signed request object based on the prompt parameter. The signed request object may be passed a JavaScript object notation (JSON) web token using a second private key. The second private key comprises an asymmetric key corresponding to a second public key of the client backend app. The second public key may then be registered with the PSPB. The PSPB may then access the second public key for verifying the JSON web token, and, thereby verify the authorization request.

In various implementations, the registration endpoint (e.g., client backend app 108 and/or PSPB 130) may verify if a user is allowed to proceed to passkey registration by checking, for example, if the user is correctly logged in with an existing method such as username and password, or one-time-password (OTP), and possesses an authentication token or logged in session.

In various implementations, if the user is authorized to register, the endpoint server (e.g., server(s) 102, e.g., via client backend app 108) prepares a valid redirection URL to an OpenID authorization endpoint on passkey service provider backend (e.g., PSPB 130). The URL may be based on an organization name assigned to an account registered with the PSBP (e.g., a URL: [Hyper Text Transfer Protocol Secure]://{org-name}.accounts.justpass.me/openid/authorize/). A request sent to the URL may contain parameters, such as a username (e.g., a current logged in username), a prompt parameter (e.g., "create"), the platform type (e.g., req.headers["platform"] ("web" or "mobile")), a nonce value, a state value, and/or other values that may be saved in the user session for later retrieval and verification. In addition, a signature value may also be provided, where the signature comprises a signed value of all the parameters using the OpenID client secret provided by PSPB (e.g., PSPB 130).

With further reference to security registration and authentication method 200, at block 258, the security registration algorithm comprises detecting a type of the client device. For example, in one implementation parameters, headers, or otherwise values of the authorization request may indicate whether the client device is a mobile device (e.g., where the backend app 108 may detect a "mobile" value in the authorization request). For example, any cookie values associated with the client backend and/or extra headers, e.g., such as authentication token values that establish that the user is logged in, may be sent with the authorization request. Such values may contain parameters indication the type of client device.

For example, a mobile parameter or otherwise value may indicate that the type of client device is a mobile client device (e.g., computing device 111*c*1) implementing a native mobile operating system (OS) configured to execute or interact with the client frontend app. In such aspects, a set of client computing instructions of the client frontend app (e.g., client frontend app 111*a*) may be generated by a native software development kit (SDK) corresponding to the native mobile OS (e.g., APPLE IOS).

If no mobile value is detected, the client backend app 108 may determine that the type of client device is a computing device (e.g., computing device 111*c*3) is implementing a web browser. Of course, it is to be understood that additional or different parameters, values, or implementations can be used to determine the type of client device.

With reference to blocks 260, 270, 402, and 422, security registration and authentication method 200 further comprises invoking passkey registration, according to the type of the client device (e.g., mobile or web), to generate a passkey for the client device. A passkey may comprise a public-private key pair having a public key and a private key. Passkey registration may comprise sending a request to register a user of the client device at a passkey service provider backend (e.g., PSPB 130). Still further, passkey registration may comprise saving, in a memory of the PSPB (e.g., PSPB 130), the public key. Still further, passkey registration may comprise saving, in the client memory (e.g., memory of a client device), the private key. In this way the passkey is distributed across client and backend devices and may be used for future authentication requests.

A more detailed of implementation of the security registration algorithm is provided as follows. On a client device implementing a browser, passkey registration is invoked by redirecting the user's client device to a web page that requests the browser to implement the passkey registration process. With respect to a mobile device, passkey registration is invoked by sending back a security challenge (e.g., in JSON format) to generate the native SDK to generate a passkey, as described herein. The user's client device may be redirected to the PSPB OpenID authorization endpoint (e.g., at PSPB 130), where information regarding the user's client device is looked up from a unique organization name in the uniform resource locator (URL) from which the OpenID client shared secret value is looked up. The signature field may be decoded and verified against the supplied parameters. If the signature is verified, or otherwise correct, the request is trusted as genuine, or otherwise secure, by the client backend (e.g., client backend app 108) and the user is allowed to proceed to registration.

Figure 4A:
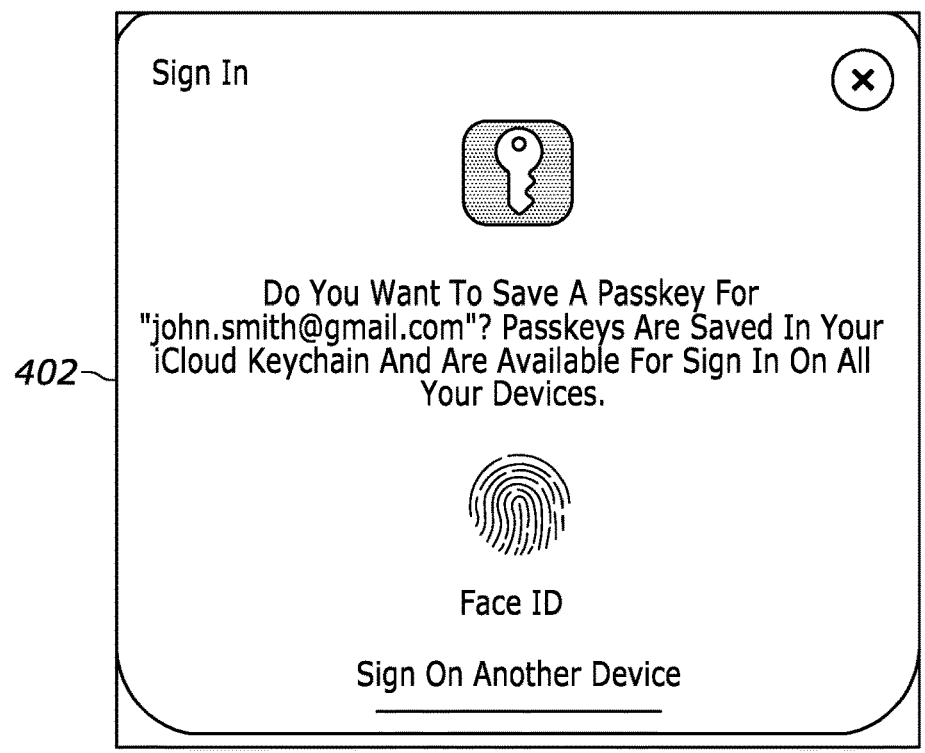
FIG. 4A illustrates an example mobile graphic user interface regarding passkey registration as rendered on a display screen of a mobile device, in accordance with various aspects disclosed herein.
Figure 4B:
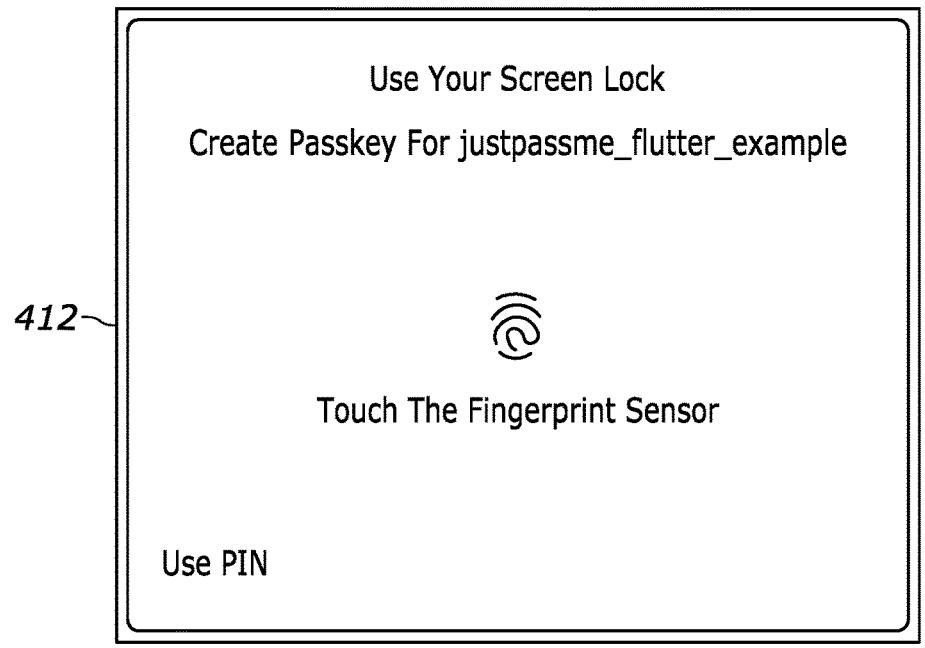
FIG. 4B illustrates an example mobile graphic user interface regarding passkey registration as rendered on a display screen of a further mobile device, in accordance with various aspects disclosed herein.
Figure 4C:
FIG. 4C illustrates an example web graphic user interface regarding passkey registration as rendered on a display screen of a computing device, in accordance with various aspects disclosed herein.

The platform parameter may be check based on the type of client device. For example, with reference to security registration and authentication method 200 at block 260, the type of client device is detected to be, or otherwise determined to be, a web-based client device (e.g., computing device 111c3). In such implementation, the client device is redirected to web based passkey registration. As shown, a webpage rendered with HTML contains JavaScript code that executes a function (navigator.credential.create) of a web JavaScript API to create a passkey credential via a browser. For example, FIG. 4C illustrates an example web graphic user interface 422 (e.g., rendered via HTML) for passkey registration as rendered on a display screen of a computing device (e.g., computing device 111c3), in accordance with various aspects disclosed herein. Graphic user interface 422 may be implemented or rendered via a web interface, such as via a web browser application, e.g., Safari and/or Google Chrome app(s), or other such web browser or the like.

As another example, with reference to security registration and authentication method 200 at block 270, the type of client device is detected to be, or otherwise determined to be, a mobile based client device (e.g., computing device 111c1). In such implementation, the client device is sent a passkey registration challenge. That is, a redirect request may be generated and submitted to the PSPB. The redirect request may include the platform header. The redirect request invokes the PSPB to send a passkey generation request to the client frontend app. For example, the determination that the client device is seeking registration may cause client device to receive a FIDO registration request. In such implementation, a JSON data payload may be generated and sent to the mobile device. An example of the JSON data payload is shown by FIG. 6A. FIG. 6A illustrates an example data payload for passkey registration of a mobile device via a computer network (e.g., computer network 120), in accordance with various aspects disclosed herein. In the example of FIG. 6A, the data payload includes information for identification and/or generation of a public key, including an organization name (org-name) id, user information (e.g., username, id, display name), challenge used for security clearance, and public key credential parameters. It is to be understood, however, that additional and/or different parameters may be used for the data payload for passkey registration of a mobile device via a computer network, e.g., compute network 120.

Figure 3A:
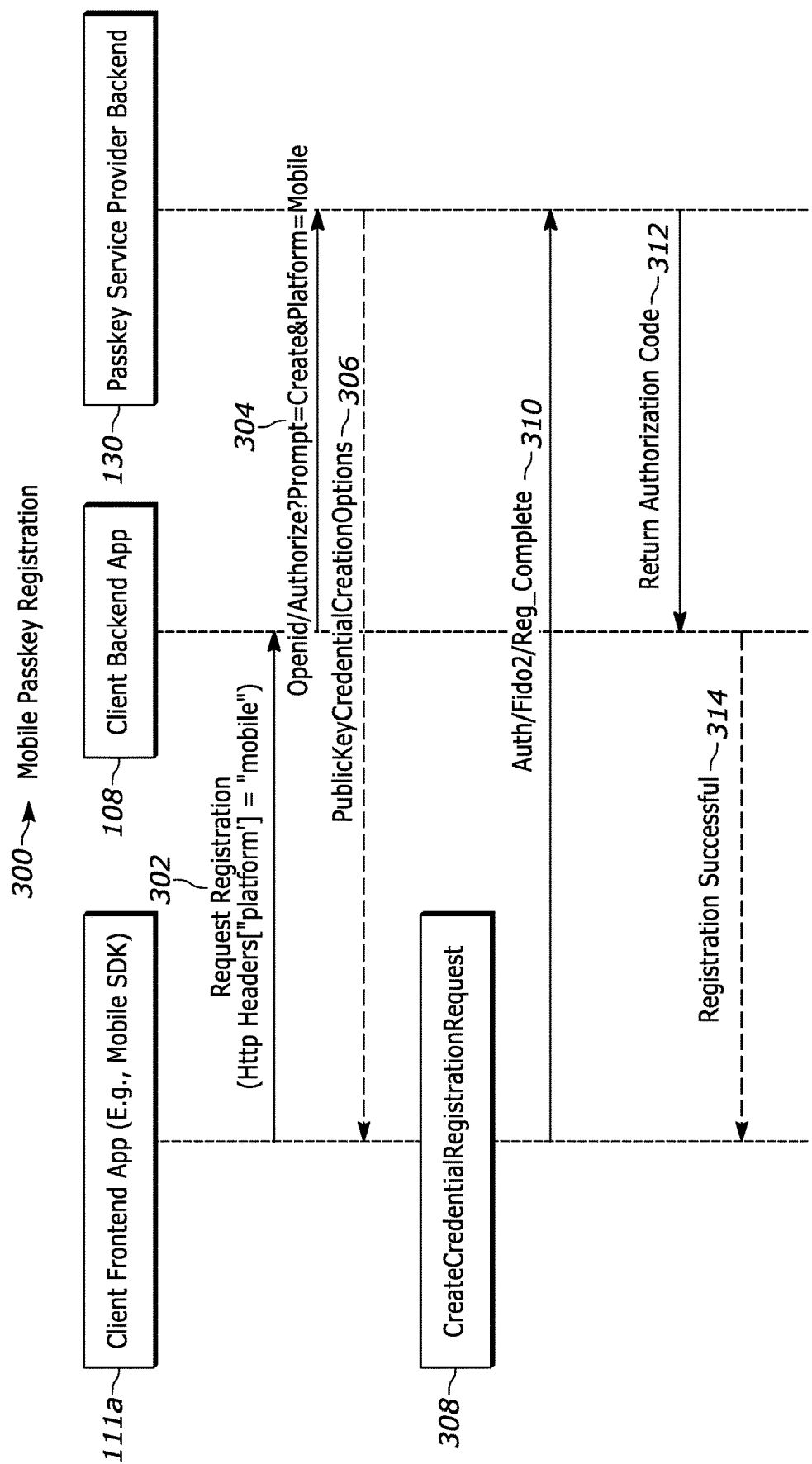
FIG. 3A illustrates an example security registration method for extending OpenID security standards for registration of OpenID on mobile client devices, in accordance with various aspects disclosed herein.

The FIDO registration request may invoke a native passkey generation on the client device (e.g., initiated by calling function PublicKeyCredentialCreationOptions as shown and described for FIG. 3A). The passkey may be generated by a passkey generator-and-authenticator (e.g., a native passkey generator of a mobile device) based on user information, such as user supplied information (e.g. a password or other information supplied by the user, which may be user specific). Additionally, or alternatively, the passkey may be generated based on biometric data. For example, in some implementations, the passkey generator-and-authenticator collects biometric data of the user. In such implementations, a first set of biometric data of the user may be used to generate the passkey during the execution of the secure registration algorithm. For example, FIGS. 4A and 4B depict implementation where a mobile native passkey SDK is invoked to request biometric data from a user for passkey registration. FIG. 4A illustrates an example mobile graphic user interface 402 regarding passkey registration as rendered on a display screen of a mobile device (e.g., computing device 111c1), in accordance with various aspects disclosed herein. The implementation of FIG. 4A depicts an example native screen as rendered by the APPLE IOS operating system. Such screen may be invoked by calling an iOS SDK native function (e.g., the CreateCredentialRegistrationRequest function), which may request a biometric data, e.g., face and/or fingerprint based biometric data of the user for registration of the user.

FIG. 4B illustrates a further example mobile graphic user interface 412 regarding passkey registration as rendered on a display screen of a further mobile device (e.g., computing device 111c2), in accordance with various aspects disclosed herein. The implementation of FIG. 4B depicts an example native screen as rendered by the GOOGLE ANDROID operating system. Such screen may be invoked by calling the ANDROID SDK native function (CreatePublicKeyCredentialRequest), which may request a biometric data, e.g., face and/or fingerprint based biometric data of the user for registration of the user.

Each of mobile graphic user interface 402 and mobile graphic user interface 412 may be rendered on a display screen of a user computing device (e.g., user computing device 111c1 or 111c2) in accordance with various aspects disclosed herein. The client frontend app may generate a passkey using a passkey generator-and-authenticator as implemented through the native SDK of the native mobile OS. For example, as shown in the examples of FIGS. 4A and 4B, graphic user interface 402 and mobile graphic user interface 412 may be implemented or rendered via a native app (e.g., a passkey generator-and-authenticator app), where the graphic user interface 402 and mobile graphic user interface 412 may be popup screens of the passkey generator-and-authenticator app, which may run as a background processor or daemon of the native operating system. Such native apps may be implemented or coded (e.g., as computing instructions) in a computing language (e.g., SWIFT) executable by the user computing device operating system (e.g., APPLE iOS) by the processor of user computing device. In various aspects, the client frontend app (e.g., client frontend app 111a) executing on a mobile devices, such as user computing device 111c1, may communicate with client backend app (e.g., client backend app 108) and/or PSPB 130 as described herein.

Implementation or otherwise invocation or use of native screens provides a seamless GUI experience for the user, and also makes provides a more secure implementation because the public and/or provide key is stored the mobile device itself, which is untampered with. This is also allows the operating system to implement passkey registration more efficiently because native implementation of native screens results in greater computational efficiency through less processing and/or memory storage compared to use of additional non-native screens, text, or graphics.

With further reference to security registration and authentication method 200, at block 280, successful passkey registration and/or creation returns the generated public key and the signature for the challenge, where the public key can be verified and saved at the PSPB (e.g., PSPB 130). For example, in one implementation, successful authentication of passkey registration and/or creation returns a FIDO PublicKeyCredential containing the public key and the signature for the challenge. The PublicKeyCredential function may then cause registration information to be sent to an endpoint URL (e.g., an [Hyper Text Transfer Protocol Secure]s://{org-name}.accounts.justpass.me/auth/fido2/reg_complete/endpoint), e.g., at PSPB 130, where the challenge may retrieved from the session and the signature of the challenge is verified. Once verified the public may be saved for the given username to be used for future passkey login. For example, for a mobile implementation, the mobile SDK of the client frontend app transmits the public key to the PSPB. Once the registration is successful, the request is redirected to the OpenID redirect URL with a successful registration communication or otherwise indication.

With further reference to security registration and authentication method 200, at block 206, the authentication registration algorithm is implemented, where the prompt value does not define or otherwise does not include the create value, indicating that the authentication algorithm is to be invoked. However, it is to be understood, that other parameters may be used to invoke the authentication algorithm. At block 206, the authentication algorithm may comprise detecting the type of the client device. Detection of the type of client device may be performed in the same or similar manner as described for block 258 herein or elsewhere herein.

With reference to blocks 208, 218, 502, and 522, security registration and authentication method 200 further comprises invoking a passkey login, according to the type of the client device. Passkey login comprises invoking the PSPB (e.g., PSPB 130) to send a security challenge and to receive in response a signed security challenge from the client device (e.g., computing device 111c1). The signed security challenge may comprise the security challenge being signed with a private key as stored on the client device. The client device may then be authenticated by the client device by verifying the signed security challenge with the public key.

In some aspects, security registration and authentication method 200 comprises an authentication endpoint (e.g., client backend app 108), which verifits that a user is allowed to proceed to passkey authentication. In most cases the user is allowed to proceed to authentication except for when passkeys are used for 2nd factor authentication, in which case the user might need to verify that they passed the first factor successfully using the current login session.

If a user is allowed to proceed, the authentication endpoint (e.g., client backend app 108) prepares a valid redirection URL to an OpenID authorization endpoint on passkey service provider backend (e.g., PSBP 130). The URL may be based on an organization name assigned to an account registered with the PSBP (e.g., a URL: [Hyper Text Transfer Protocol Secure]://{org-name}.accounts.justpass.me/openid/authorize/). A request sent to the URL may contain parameters, such as a username (e.g., a current logged in username), a prompt parameter (e.g., "login"), the platform type (e.g., req.headers["platform"] ("web" or "mobile")), a nonce value, a state value, and/or other values that may be saved in the user session for later retrieval and verification. In addition, a signature value may also be provided, where the signature comprise a signed value of all the parameters using the OpenID client secret provided by PSPB (e.g., PSPB 130).

The user may be redirected to the PSPB OpenID authorization endpoint (e.g., at PSPB 130), where information regarding the user's client device is looked up from a unique organization name in the uniform resource locator (URL) from which the OpenID client shared secret value is looked up. The signature field may be decoded and verified against the supplied parameters. If the signature is verified, or otherwise correct, the request is trusted as genuine, or otherwise secure, by the client backend (e.g., client backend app 108) and the user is allowed to proceed to authentication.

Figure 5A:
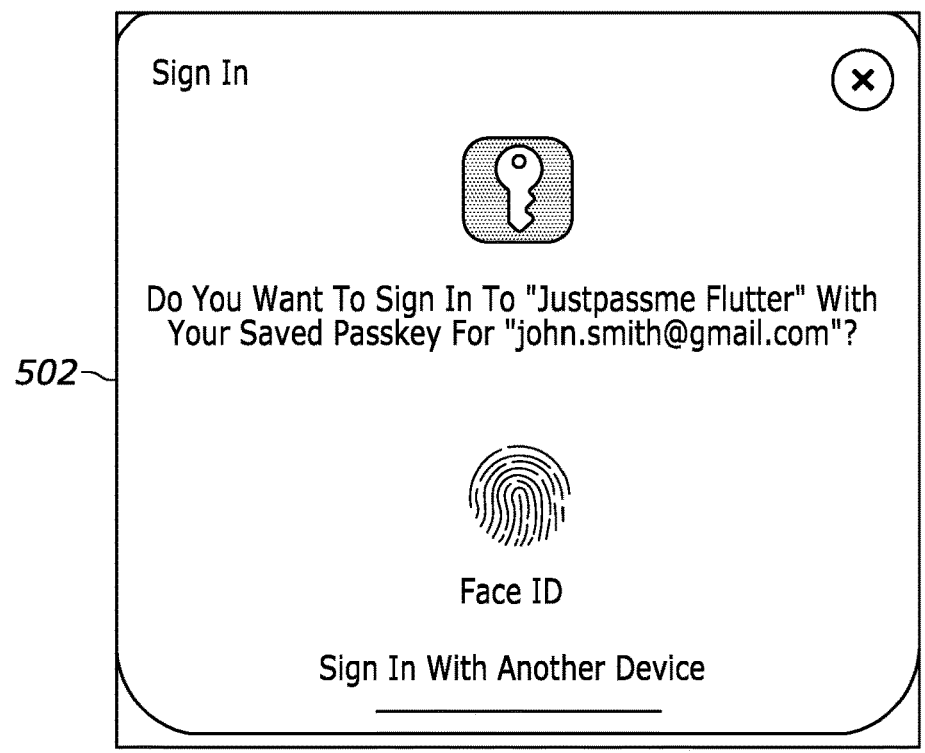
FIG. 5A illustrates an example mobile graphic user interface regarding passkey authentication as rendered on a display screen of a mobile device, in accordance with various aspects disclosed herein.
Figure 5B:
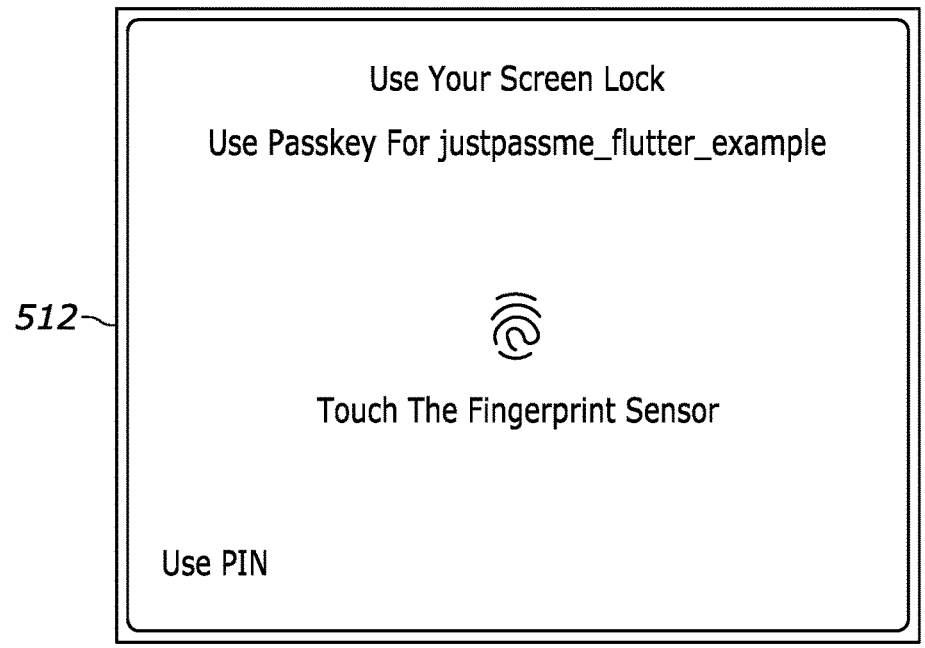
FIG. 5B illustrates an example mobile graphic user interface regarding passkey authentication as rendered on a display screen of a further mobile device, in accordance with various aspects disclosed herein.
Figure 5C:
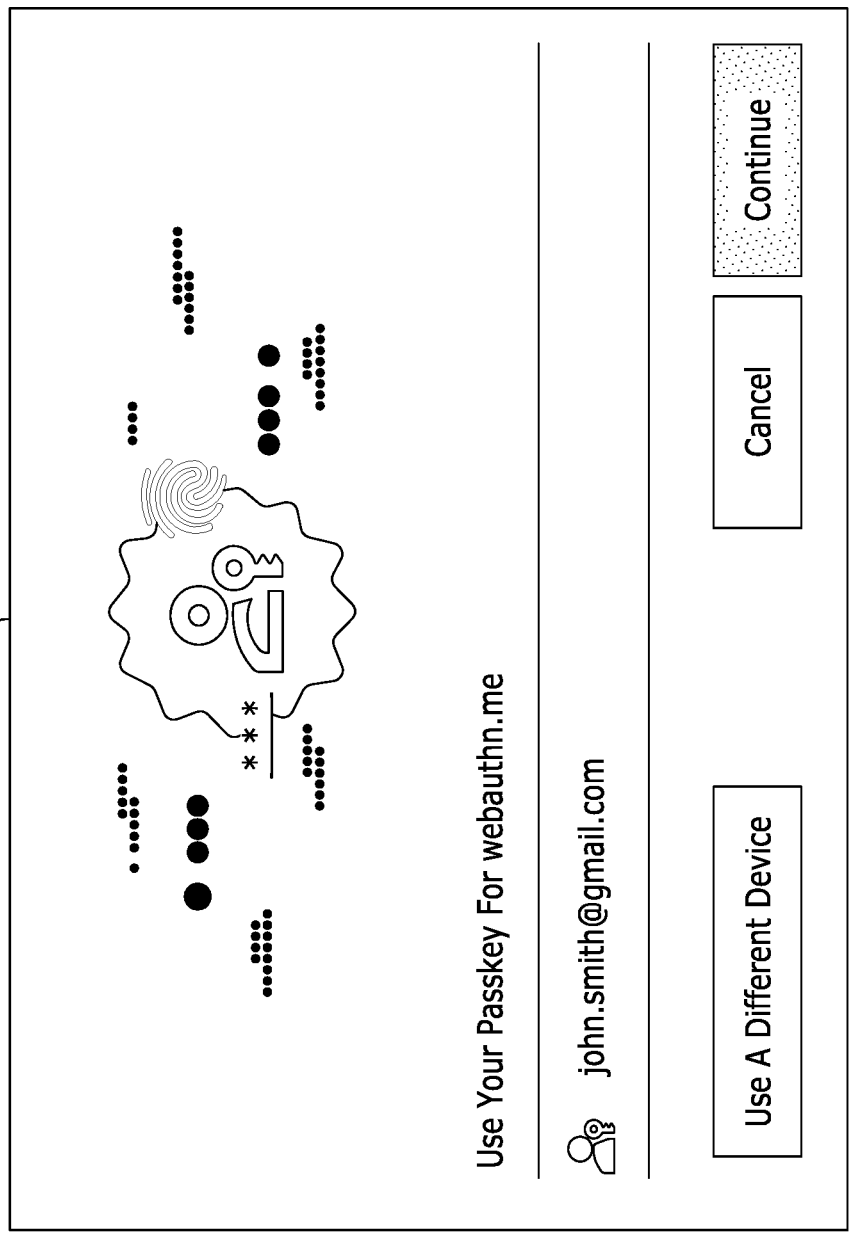
FIG. 5C illustrates an example web graphic user interface regarding passkey authentication as rendered on a display screen of a computing device, in accordance with various aspects disclosed herein.

The platform parameter may be check based on the type of client device. For example, with reference to security registration and authentication method 200 at block 208, the type of client device is detected to be, or otherwise determined to be, a web-based client device (e.g., computing device 111c3). In such implementation, the client device is redirected to web-based passkey login. As shown, a webpage rendered with HTML contains JavaScript code that executes a function (navigator.credential.get) of a web JavaScript API to create a passkey credential via a browser. For example, FIG. 5C illustrates an example web graphic user interface 522 (e.g., rendered via HTML) regarding passkey authentication as rendered on a display screen of a computing device (e.g., computing device 111c3), in accordance with various aspects disclosed herein. Graphic user interface 522 may be implemented or rendered via a web interface, such as via a web browser application, e.g., Safari and/or Google Chrome app(s), or other such web browser or the like.

As another example, with reference to security registration and authentication method 200 at block 218, the type of client device is detected to be, or otherwise determined to be, a mobile based client device (e.g., computing device 111c1). In such implementation, the client device is sent a passkey login challenge. That is, a redirect request may be generated and submitted the PSPB. The redirect request may include the platform header. The redirect request invokes the PSPB to send a passkey login request to the client frontend app. That is, a redirect request may include the platform header and may invoke the PSPB to send a security challenge to the client frontend app (e.g., client frontend app 111a). The client frontend may authenticate the user by signing the challenge using the private key generate by the passkey generator-and-authenticator as implemented through the native SDK of the native mobile OS.

For example, the determination that the client device is a mobile device may cause client device to receive a FIDO login request. In such implementation, a JSON data payload may be is generated and sent to the mobile device. An example of the JSON data payload is shown by FIG. 6B. FIG. 6B illustrates an example data payload for passkey authentication of a mobile device via a computer network (e.g., computer network 120), in accordance with various aspects disclosed herein. In the example of FIG. 6B, the data payload includes information for identification and/or authorization via a public key and/or its related information, including an organization name (org-name) and a challenge, e.g., including a request for random generation of such challenge. It is to be understood, however, that additional and/or different parameters may be used for the data payload for passkey authentication of a mobile device via a computer network.

Figure 3B:
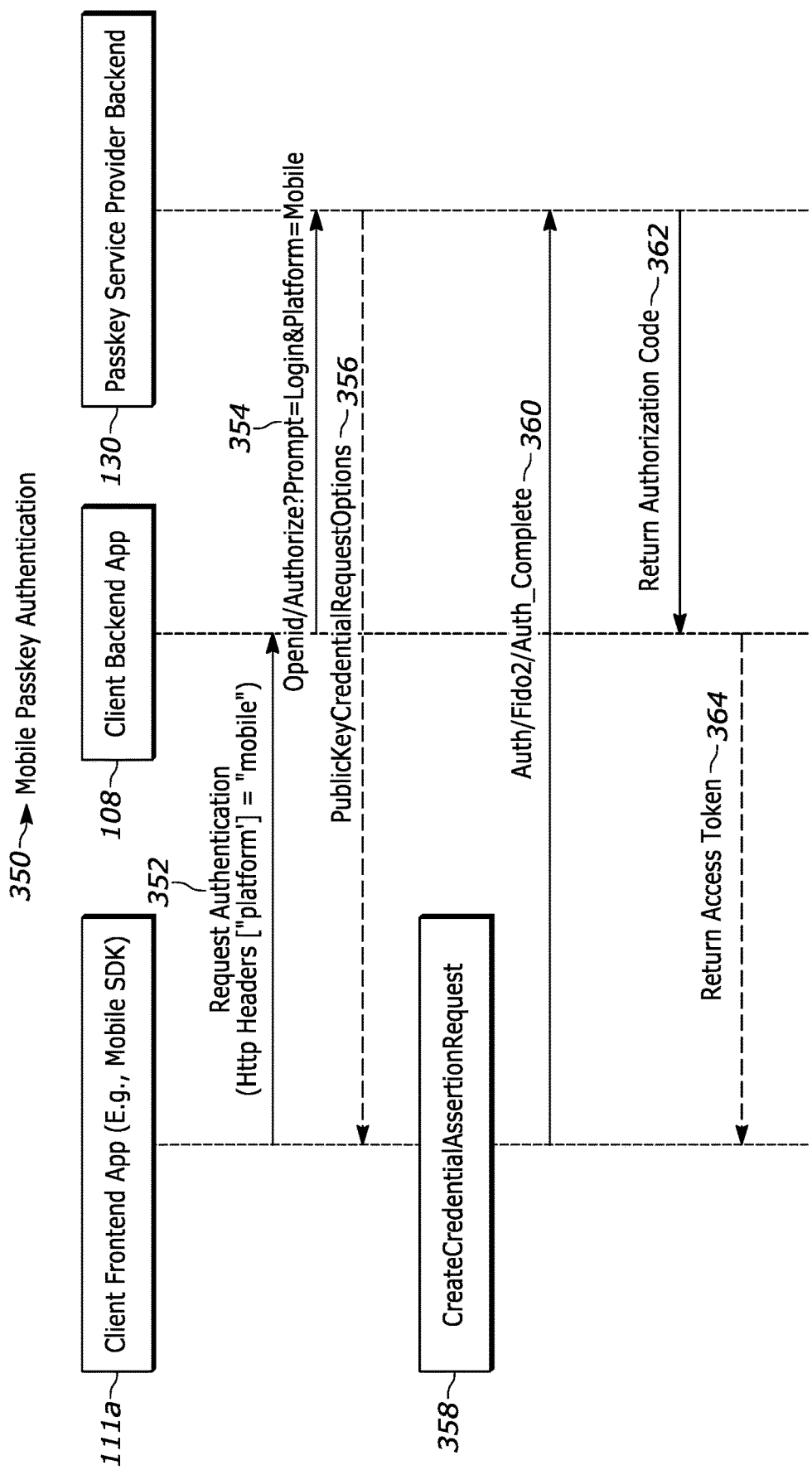
FIG. 3B illustrates an example security authentication method for extending OpenID security standards for passkey authentication on mobile client devices, in accordance with various aspects disclosed herein.

The FIDO authentication request may invoke a native passkey authorization on the client device (e.g., initiated by calling function PublicKeyCredentialRequestOptions as shown and described for FIG. 3B). The passkey may be authenticated by a passkey generator-and-authenticator (e.g., a native passkey authentication of a mobile device) based on user information, such as user supplied information (e.g. a password or other information supplied by the user, which may be user specific), such as the same user supplied information used to register the passkey. Additionally, or alternatively, the passkey may be authenticated based on biometric data, including the same biometric data used to register the passkey. For example, in some implementations, the passkey generator-and-authenticator collects biometric data of the user. In such implementations, a second set of biometric data is used to authenticate the user during execution of the authentication algorithm. For example, FIGS. 5A and 5B depict implementations where a mobile native passkey SDK is invoked to request biometric data from a user for passkey authentication. FIG. 5A illustrates an example mobile graphic user interface 502 regarding passkey authentication as rendered on a display screen of a mobile device (e.g., computing device 111c1), in accordance with various aspects disclosed herein. The implementation of FIG. 5A depicts an example native screen as rendered by the APPLE IOS operating system. Such screen may be invoked by calling the iOS SDK native function (e.g., the CreateCredentialAssertionRequest function), which may request a biometric data, e.g., face and/or fingerprint based biometric data of the user for authentication of the user.

FIG. 5B illustrates an example mobile graphic user interface 512 regarding passkey authentication as rendered on a display screen of a further mobile device (e.g., computing device 111c2), in accordance with various aspects disclosed herein. The implementation of FIG. 5B depicts an example native screen as rendered by the GOOGLE ANDROID operating system. Such screen may be invoked by calling the ANDROID SDK native function (e.g., the GetPublicKeyCredentialOption function), which may request a biometric data, e.g., face and/or fingerprint based biometric data of the user for authentication of the user.

Each of mobile graphic user interface 502 and mobile graphic user interface 512 may be rendered on a display screen of a user computing device (e.g., user computing device 111c1 or 111c2) in accordance with various aspects disclosed herein. The client frontend app (e.g., client frontend app 111a) may generate a passkey using a passkey generator-and-authenticator as implemented through the native SDK of the native mobile OS. For example, as shown in the examples of FIGS. 5A and 5B, graphic user interface 502 and mobile graphic user interface 512 may be implemented or rendered via a native app (e.g., a passkey generator-and-authenticator app), where the graphic user interface 502 and mobile graphic user interface 512 may be popup screens of the passkey generator-and-authenticator app, which may run as a background processor or daemon of the native operating system. Such native apps may be implemented or coded (e.g., as computing instructions) in a computing language (e.g., SWIFT) executable by the user computing device operating system (e.g., APPLE iOS) by the processor of user computing device. In various aspects, the client frontend app (e.g., client frontend app 111a) executing on a mobile devices, such as user computing device 111c1, may communicate with client backend app (e.g., client backend app 108) and/or PSPB 130 as described herein.

Implementation or otherwise invocation or use of native screens provides a seamless GUI experience for the user, and also makes provides a more secure implementation because the public and/or provide key is stored the mobile device itself, which is untampered with. This is also allows the operating system to implement passkey authentication more efficiently because native implementation of native screens results in greater computational efficiency through less processing and/or memory storage compared to use of additional non-native screens, text, or graphics.

With further reference to security registration and authentication method 200, at block 230, successful passkey authentication returns the generated public key and the signature for the challenge, where the public key can be verified at the PSPB (e.g., PSPB 130). For example, in one implementation, successful authentication of passkey registration and/or creation returns a FIDO PublicKeyCredential containing the signed signature for the challenge. The PublicKeyCredential may then cause registration information to be sent to an endpoint URL (e.g., an [Hyper Text Transfer Protocol Secure]://{org-name}.accounts.justpass.me/auth/fido2/auth_complete/endpoint), e.g., at PSPB 130, where the signed challenge may retrieved from the session and the signature of the challenge is verified against all the public keys saved for that user. That is, the client frontend app 111a may transmit the signed security challenge to the PSPB. The signed security challenge may be verified by a public key, stored on PSBP 130, and as previously generated by the passkey generator-and-authenticator as implemented through the native SDK of the native mobile OS during the registration algorithm. If any stored public key successfully verifies the challenge signature created by the private key on the authenticator (e.g., an authenticator of the client device, such as the passkey generator-and-authenticator app) then authentication is successful. Once the authentication is successful, the request is redirected to the OpenID redirect URL with successful authentication with the username associated with the matching public key.

With further reference to security registration and authentication method 200, at block 230, an authentication token may then be provided to the client device (e.g., computing device 111c1) following authentication. The authentication token may authenticate the client device to initiate a secure session with a secure resource on the computer network. The secure resource may comprise access to a password secured website, access to a secured location or area of the compute network, access to secured data or information, and/or the privilege to access resources (e.g., an internet connection, a virtual private network (VNP), etc.), or other such online or cyber resource. In one implementation, an OpenID redirect URL may verify the response from PSPB (e.g., PSBP 130) using the client secret key decryption, verifying that the nonce and state stored for this user session match the nonce returned by the OpenID redirection. If all the verification is successful, the client backend logs in the user and creates a login session and/or returns to the user the authentication token to use for access to the secure resource on the computer network.

FIGS. 3A and 3B provide additional examples demonstrating security registration and authentication methods, including functions and algorithm execution and communication, among client device (e.g., client frontend app 111a), client backend (e.g., client backend app 108), and PSPB 130, where each can communicate with one another, e.g., over computer network 120, to implement and provide registration/authentication flow for passkeys. The examples of FIGS. 3A and 3B provide an example with respect to registration and authentication of a mobile device. That is, the type of the client device in the examples of FIGS. 3A and 3B comprises a mobile client device (e.g., computing device 111a) implementing a native mobile OS (e.g., APPLE IOS) configured to execute or interact with the client frontend app (e.g., client frontend app 111a). The set of client computing instructions of the client frontend app are generated by a native software development kit (SDK) corresponding to the native mobile OS. It should be understood, however, that such registration/authentication flow for passkeys could similarly apply for registration and authentication of a computing device implementing a web browser, for example, in a similar manner, including, for example, as described herein.

FIG. 3A illustrates an example security registration method 300 for extending OpenID security standards for registration of OpenID on mobile client devices, in accordance with various aspects disclosed herein. As shown for FIG. 3A, security registration method 300 comprises receiving at client backend app 108 an authorization or registration request 302 ("request registration") of the client device (e.g., received from client frontend app 111a) comprising a parameter (i.e., "mobile"), which, in the example is part of the HttpHeaders parameters defining the platform header value. In this way, security registration method 300 comprises client backend app 108 receiving from the client frontend app a platform header value that identifies the client device as a type of mobile client device for detecting that the type of the client device is a mobile client device.

Passkey registration is then invoked for the mobile client device, where client backend app 108 sends an OpenID request 304 (e.g., openid/authorize?prompt=create & platform=mobile) to PSPB 130. The request 304 includes its prompt parameter set to a create value and its platform parameter set to a mobile value. Such request invokes passkey registration. This may involve verifying a digital signature of the client device (e.g., computing device 111c1).

Invoking passkey registration for the mobile client device also comprises generating a passkey for the client device. The passkey may comprise a public-private key pair having a public key and a private key. Passkey registration comprises sending the request 304 to register a user of the client device at a passkey service provider backend (PSPB) (e.g., PSPB 130).

In various aspects, request 304 comprises a redirect request as sent to PSPB 130. The redirect request includes the platform header (e.g., mobile). The redirect request (request 304) invokes the PSPB 130 to send a security challenge 306 (e.g., PublicKeyCredentialCreationOptions) to the client frontend app (e.g., client frontend app 111a).

The redirect request triggers the client frontend app 111a to generate the passkey using a passkey generator-and-authenticator as implemented through the native SDK of the native mobile OS (e.g., via a native function, such as the createCredentialRegistrationRequest function 308). It is to be understood, however, that other registration functions may be used, including those of other operating systems and/or platforms. The private key of the passkey is saved on a client computer memory of the client device (e.g., computing device 111c1).

The client frontend app 111a then transmits a communication 310 (e.g., via communication or message auth/fido2/reg_complete) the public key to PSPB 130. The public key is saved on a computer memory of PSPB 130. PSPB 130 may then transmit a return authentication code 312 to client backend app 108, which may cause client backend app 108 to transmit a registration successful communication 314 to client frontend app 111a indicating that registration of the passkey has completed.

FIG. 3B illustrates an example security authentication method 350 for extending OpenID security standards for passkey authentication on mobile client devices, in accordance with various aspects disclosed herein. Security authentication method 350 implements an authentication algorithm where the prompt parameter does not define the create value. It should be understood, however, the authentication algorithm may be triggered in additional and/or different implementations, e.g., where the prompt parameter includes an authentication parameter (e.g., "auth") indicating that authentication should occur, instead of registration.

As shown for FIG. 3B, security authentication method 350 comprises receiving at client backend app 108 an authorization or registration request 352 ("request authorization") of the client device (e.g., received from client frontend app 111a) comprising a parameter (i.e., "mobile"), which, in the example, is part of the HttpHeaders parameters defining the platform. In this way, security authorization method 350 comprises client backend app 108 receiving from the client frontend app 111a a platform header that identifies the client device as a type of mobile client device and detecting that the type of the client device is a mobile client device.

Passkey login, or otherwise authorization, is then invoked for the mobile client device, where client backend app 108 sends an OpenID request 354 (e.g., openid/authorize?prompt=login & platform=mobile) to PSPB 130. The request 354 includes its prompt parameter set to a login value and its platform parameter set to a mobile value. Such request invokes passkey login or otherwise authorization. This may involve verifying a digital signature of the client device (e.g., computing device 111c1).

In various aspects, request 354 comprises redirect request as sent to PSPB 130. The redirect request includes the platform header (e.g., mobile). The redirect request (request 354) invokes the PSPB 130 to send a security challenge via a passkey public key authentication request 356 (e.g., PublicKeyCredentialRequestOptions) to the client frontend app (e.g., client frontend app 111a).

The redirect request triggers the client frontend app 111a to perform authentication using the passkey generator-and-authenticator as implemented through the native SDK of the native mobile OS. Authentication comprises signing the security challenge with the private key stored on the client device to create a signed security challenge. That is, the client frontend app 111a or otherwise client device, or operating system thereof, authenticates the user by signing the challenge using the private key previously generated by the passkey generator-and-authenticator as implemented through the native SDK of the native mobile OS. Authentication may be implemented via a native function, such as the createCredentialAssertionRequest function 358. It is to be understood, however, that other authentication functions may be used, including those of other operating systems and/or platforms.

The client frontend app 111a then transmits 360 (e.g., via communication or message auth/fido2/auth_complete) the signed security challenge to PSPB 130. The client device (e.g., computing device 111c1) implementing the client frontend app 111a is then authenticated by PSPB 130 verifying the signed security challenge with the public key stored on the PSPB 130. That is, the signed security challenge is verified by the public key as previously generated by the passkey generator-and-authenticator as implemented through the native SDK of the native mobile OS, and then stored on the PSPB 130 during registration.

PSPB 130 may then transmit a return authentication code 362 to client backend app 108, which may cause client backend app 108 to transmit or provide a communication 364 comprising an authentication token to client frontend app 111a of the client device (e.g., computing device 111c1). The authentication token may then authenticate the client device (e.g., computing device 111c1) to initiate a secure session with a secure resource on the computer network (e.g., computer network 120), for example, as described herein.

Additional Aspects of the Disclosure

The following aspects are provided as examples in accordance with the disclosure herein and are not intended to limit the scope of the disclosure.

Aspect 1. A security registration and authentication system (100) configured to extend OpenID security standards for registration of OpenID client devices for passkey authentication, the security registration and authentication system (100) comprising: a registration and authentication server comprising a server memory (106) and a server processor (104); a set of client computing instructions comprising a client frontend application (app) configured for storage on a client memory (106) of a client device, and to be executed by a client processor (104) of the client device; and a set of server computing instructions comprising a client backend app (108) configured for storage on the server memory (106), and the set of server computing instructions configured for networked communication via a computer network (120) with the set of client computing instructions, wherein the set of server computing instructions of the client backend app (108), when executed by the server processor (104), causes the server processor (104) to: receive an authorization request of the client device comprising a prompt parameter, and implementing one of: (a) a secure registration algorithm if the prompt parameter defines a create value; or (b) an authentication algorithm if the prompt parameter does not define the create value, wherein the secure registration algorithm comprises: verifying a digital signature of the client device, detecting a type of the client device, invoking passkey registration, according to the type of the client device, to generate a passkey for the client device, the passkey comprising a public-private key pair having a public key and a private key, and the passkey registration comprising sending a request to register a user of the client device at a passkey service provider backend (PSPB (130)), saving, in a memory (106) of the PSPB (130), the public key, and saving, in the client memory (106), the private key, wherein the authentication algorithm comprises: detecting the type of the client device, invoking a passkey login, according to the type of the client device, comprising invoking the PSPB (130) to send a security challenge and to receive in response a signed security challenge from the client device, the signed security challenge comprising the security challenge signed with the private key, and authenticating the client device by verifying the signed security challenge with the public key, and provide an authentication token to the client device, the authentication token authenticating the client device to initiate a secure session with a secure resource on the computer network (120).

Aspect 2. The security registration and authentication system (100) of Aspect 1, wherein the type of client device is a mobile client device implementing a native mobile operating system (OS) configured to execute or interact with the client frontend app (111a), the set of client computing instructions of the client frontend app (111a) generated by a native software development kit (SDK) corresponding to the native mobile OS, and wherein the secure registration algorithm further comprises: receiving from the client frontend app (111a) a platform header that identifies the client device as a type of mobile client device, generating and submitting a redirect request to the PSPB (130), the redirect request including the platform header, wherein the redirect request invokes the PSPB (130) to send a passkey generation request to the client frontend app (111a), wherein the client frontend app (111a) generates the passkey using a passkey generator-and-authenticator as implemented through the native SDK of the native mobile OS, and wherein the client frontend app (111a) transmits the public key to the PSPB (130); wherein the authentication algorithm further comprises: receiving from the client frontend app (111a) a platform header that identifies the client device as a type of mobile client device, generating and submitting a redirect request to the PSPB (130), the redirect request including the platform header, wherein the redirect request invokes the PSPB (130) to send the security challenge to the client frontend app (111a), wherein the client frontend authenticates the user by signing the challenge using the private key generate by the passkey generator-and-authenticator as implemented through the native SDK of the native mobile OS, wherein the client frontend app (111a) transmits the signed security challenge to the PSPB (130), and wherein the signed security challenge is verified by the public key as generated by the passkey generator-and-authenticator as implemented through the native SDK of the native mobile OS.

Aspect 3. The security registration and authentication system (100) of Aspect 2, wherein the passkey generator-and-authenticator collects biometric data of the user, and wherein a first set of biometric data of the user is used to generate the passkey during the execution of the secure registration algorithm, and wherein a second set of biometric data is used to authenticate the user during execution of the authentication algorithm.

Aspect 4. The security registration and authentication system (100) of any one or more of the preceding Aspects, wherein the type of client device is a computing device implementing a web browser.

Aspect 5. The security registration and authentication system (100) of any one or more of the preceding Aspects, wherein the authorization request of the client device comprising the prompt parameter is secured against forgeries by: generating, by the client backend app (108), a signature value by signing the authorization request with a shared client secret value as shared between the client backend app (108) and PSPB (130), receiving, by the PSPB (130), the authorization request, looking up, by the PSPB (130), a client identifier (ID) of the client device corresponding to the client backend app (108), and verifying, by the PSPB (130), the signature value with the shared client secret value.

Aspect 6. The security registration and authentication system (100) of any one or more of the preceding Aspects, wherein the authorization request of the client device comprising the prompt parameter is secured against forgeries by: generating a signed request object based on the prompt parameter, passing the signed request object as a JavaScript object notation (JSON) web token using a second private key, wherein the second private key comprises an asymmetric key corresponding to a second public key of the client backend app (108), and wherein the second public key is registered with and is accessible to the PSPB (130) for verifying the JSON web token.

Aspect 7. A security registration and authentication method (200) for extending OpenID security standards for registration of OpenID client devices for passkey authentication, the security registration and authentication method (200) comprising: receiving, by a client backend app (108) executing on a registration and authentication server, server memory (106), an authorization request comprising a prompt parameter from a client device, wherein client device comprises client memory (106) storing a set of client computing instructions comprising a client frontend application (app) executing on a client processor (104) of the client device, and wherein the authorization request is received via a computer network (120) and causes the client backend app (108) to implement one of: (a) a secure registration algorithm if the prompt parameter defines a create value; or (b) an authentication algorithm if the prompt parameter does not define the create value, wherein the secure registration algorithm comprises: verifying a digital signature of the client device, detecting a type of the client device, invoking passkey registration, according to the type of the client device, to generate a passkey for the client device, the passkey comprising a public-private key pair having a public key and a private key, and the passkey registration comprising sending a request to register a user of the client device at a passkey service provider backend (PSPB (130)), saving, in a memory (106) of the PSPB (130), the public key, and saving, in the client memory (106), the private key, wherein the authentication algorithm comprises: detecting the type of the client device, invoking a passkey login, according to the type of the client device, comprising invoking the PSPB (130) to send a security challenge and to receive in response a signed security challenge from the client device, the signed security challenge comprising the security challenge signed with the private key, and authenticating the client device by verifying the signed security challenge with the public key, and providing an authentication token to the client device, the authentication token authenticating the client device to initiate a secure session with a secure resource on the computer network (120).

Aspect 8. The security registration and authentication method (200) of Aspect 7, wherein the type of client device is a mobile client device implementing a native mobile operating system (OS) configured to execute or interact with the client frontend app (111a), the set of client computing instructions of the client frontend app (111a) generated by a native software development kit (SDK) corresponding to the native mobile OS, and wherein the secure registration algorithm further comprises: receiving from the client frontend app (111a) a platform header that identifies the client device as a type of mobile client device, generate and submit a redirect request to the PSPB (130), the redirect request including the platform header, wherein the redirect request invokes the PSPB (130) to send a passkey generation request to the client frontend app (111a), wherein the client frontend app (111a) generates the passkey using a passkey generator-and-authenticator as implemented through the native SDK of the native mobile OS, and wherein the client frontend app (111a) transmits the public key to the PSPB (130); wherein the authentication algorithm further comprises: receiving from the client frontend app (111a) a platform header that identifies the client device as a type of mobile client device, generate and submit a redirect request to the PSPB (130), the redirect request including the platform header, wherein the redirect request invokes the PSPB (130) to send the security challenge to the client frontend app (111a), wherein the client frontend authenticates the user by signing the challenge using the private key generated by the passkey generator-and-authenticator as implemented through the native SDK of the native mobile OS, wherein the client frontend app (111a) transmits the signed security challenge to the PSPB (130), and wherein the signed security challenge is verified by the public key as generated by the passkey generator-and-authenticator as implemented through the native SDK of the native mobile OS.

Aspect 9. The security registration and authentication method (200) of Aspect 8, wherein the passkey generator-and-authenticator collects biometric data of the user, and wherein a first set of biometric data of the user is used to generate the passkey during the execution of the secure registration algorithm, and wherein a second set of biometric data is used to authenticate the user during execution of the authentication algorithm.

Aspect 10. The security registration and authentication method (200) of any one or more of Aspects 7-9, wherein the type of client device is a computing device implementing a web browser.

Aspect 11. The security registration and authentication method (200) of any one or more of Aspects 7-10, wherein the authorization request of the client device comprising the prompt parameter is secured against forgeries by: generating, by the client backend app (108), a signature value by signing the authorization request with a shared client secret value as shared between the client backend app (108) and PSPB (130), receiving, by the PSPB (130), the authorization request, looking up, by the PSPB (130), a client identifier (ID) of the client device corresponding to the client backend app (108), and verifying, by the PSPB (130), the signature value with the shared client secret value.

Aspect 12. The security registration and authentication method (200) of any one or more of Aspects 7-11, wherein the authorization request of the client device comprising the prompt parameter is secured against forgeries by: generating a signed request object based on the prompt parameter, passing the signed request object as a JavaScript object notation (JSON) web token using a second private key, wherein the second private key comprises an asymmetric key corresponding to a second public key of the client backend app (108), and wherein the second public key is registered with and is accessible to the PSPB (130) for verifying the JSON web token.

Aspect 13. A tangible, non-transitory computer-readable medium storing instructions of a client backend application (app) for extending OpenID security standards for registration of OpenID client devices for passkey authentication, that when executed by one or more processors cause the one or more processors to: receive, by a client backend app (108) executing on a registration and authentication server, server memory (106), an authorization request comprising a prompt parameter from a client device, wherein client device comprises client memory (106) storing a set of client computing instructions comprising a client frontend application (app) executing on a client processor (104) of the client device, and wherein the authorization request is received via a computer network (120) and causes the client backend app (108) to implement one of: (a) a secure registration algorithm if the prompt parameter defines a create value; or (b) an authentication algorithm if the prompt parameter does not define the create value, wherein the secure registration algorithm comprises: verifying a digital signature of the client device, detecting a type of the client device, invoking passkey registration, according to the type of the client device, to generate a passkey for the client device, the passkey comprising a public-private key pair having a public key and a private key, and the passkey registration comprising sending a request to register a user of the client device at a passkey service provider backend (PSPB (130)), saving, in a memory (106) of the PSPB (130), the public key, and saving, in the client memory (106), the private key, wherein the authentication algorithm comprises: detecting the type of the client device, invoking a passkey login, according to the type of the client device, comprising invoking the PSPB (130) to send a security challenge and to receive in response a signed security challenge from the client device, the signed security challenge comprising the security challenge signed with the private key, and authenticating the client device by verifying the signed security challenge with the public key, and provide an authentication token to the client device, the authentication token authenticating the client device to initiate a secure session with a secure resource on the computer network (120).

Aspect 14. The tangible, non-transitory computer-readable medium of Aspect 13, wherein the type of client device is a mobile client device implementing a native mobile operating system (OS) configured to execute or interact with the client frontend app (111*a*), the set of client computing instructions of the client frontend app (111*a*) generated by a native software development kit (SDK) corresponding to the native mobile OS, and wherein the secure registration algorithm further comprises: receiving from the client frontend app (111*a*) a platform header that identifies the client device as a type of mobile client device, generating and submitting a redirect request to the PSPB (130), the redirect request including the platform header, wherein the redirect request invokes the PSPB (130) to send a passkey generation request to the client frontend app (111*a*), wherein the client frontend app (111*a*) generates the passkey using a passkey generator-and-authenticator as implemented through the native SDK of the native mobile OS, and wherein the client frontend app (111*a*) transmits the public key to the PSPB (130); wherein the authentication algorithm further comprises: receiving from the client frontend app (111*a*) a platform header that identifies the client device as a type of mobile client device, generating and submitting a redirect request to the PSPB (130), the redirect request including the platform header, wherein the redirect request invokes the PSPB (130) to send the security challenge to the client frontend app (111*a*), wherein the client frontend authenticates the user by signing the challenge using the private key generated by the passkey generator-and-authenticator as implemented through the native SDK of the native mobile OS, wherein the client frontend app (111*a*) transmits the signed security challenge to the PSPB (130), and wherein the signed security challenge is verified by the public key as generated by the passkey generator-and-authenticator as implemented through the native SDK of the native mobile OS.

Aspect 15. The tangible, non-transitory computer-readable medium of Aspect 14, wherein the passkey generator-and-authenticator collects biometric data of the user, and wherein a first set of biometric data of the user is used to generate the passkey during the execution of the secure registration algorithm, and wherein a second set of biometric data is used to authenticate the user during execution of the authentication algorithm.

Aspect 16. The tangible, non-transitory computer-readable medium of any one or more of Aspects 13-15, wherein the type of client device is a computing device implementing a web browser.

Aspect 17. The tangible, non-transitory computer-readable medium of any one or more of Aspects 13-16, wherein the authorization request of the client device comprising the prompt parameter is secured against forgeries by: generating, by the client backend app (108), a signature value by signing the authorization request with a shared client secret value as shared between the client backend app (108) and PSPB (130), receiving, by the PSPB (130), the authorization request, looking up, by the PSPB (130), a client identifier (ID) of the client device corresponding to the client backend app (108), and verifying, by the PSPB (130), the signature value with the shared client secret value.

Aspect 18. The tangible, non-transitory computer-readable medium of any one or more of Aspects 13-17, wherein the authorization request of the client device comprising the prompt parameter is secured against forgeries by: generating a signed request object based on the prompt parameter, passing the signed request object as a JavaScript object notation (JSON) web token using a second private key, wherein the second private key comprises an asymmetric key corresponding to a second public key of the client backend application, and wherein the second public key is registered with and is accessible to the PSPB (130) for verifying the JSON web token.

Aspect 19. A security registration and authentication system (100) configured to extend OpenID security standards for registration of OpenID client devices for passkey authentication, the security registration and authentication system (100) comprising: a registration and authentication server comprising a server memory (106) and a server processor (104); a set of client computing instructions comprising a client frontend application (app) configured for storage on a client memory (106) of a client device, and to be executed by a client processor (104) of the client device, wherein a type of the client device is a mobile client device implementing a native mobile operating system (OS) configured to execute or interact with the client frontend app (111*a*), the set of client computing instructions of the client frontend app (111*a*) generated by a native software development kit (SDK) corresponding to the native mobile OS; and a set of server computing instructions comprising a client backend app (108) configured for storage on the server memory (106), and the set of server computing instructions configured for networked communication via a computer network (120) with the set of client computing instructions, wherein the set of server computing instructions of the client backend app (108), when executed by the server processor (104), causes the server processor (104) to: receive an authorization request of the client device comprising a prompt parameter, and implementing one of: (a) a secure registration algorithm if the prompt parameter defines a create value; or (b) an authentication algorithm if the prompt parameter does not define the create value, wherein the secure registration algorithm comprises: verifying a digital signature of the client device, receiving from the client frontend app (111*a*) a platform header that identifies the client device as a type of mobile client device, detecting that the type of the client device is a mobile client device, invoking passkey registration, for the mobile client device, to generate a passkey for the client device, the passkey comprising a public-private key pair having a public key and a private key, and the passkey registration comprising sending a request to register a user of the client device at a passkey service provider backend (PSPB (130)), wherein the passkey registration also comprises generating and submitting a redirect request to the PSPB (130), the redirect request including the platform header, wherein the redirect request invokes the PSPB (130) to send a security challenge to the client frontend app (111*a*), wherein the client frontend app (111*a*) generates the passkey using a passkey generator-and-authenticator as implemented through the native SDK of the native mobile OS, wherein the client frontend app (111*a*) transmits the public key to the PSPB (130), saving, in a memory (106) of the PSPB (130), the public key, and saving, in the client memory (106), the private key, wherein the authentication algorithm comprises: receiving from the client frontend app (111*a*) a platform header that identifies the client device as a type of mobile client device, detecting that the type of the client device is a mobile client device, invoking a passkey login, for the mobile client device, comprising invoking the PSPB (130) to send the security challenge and to receive in response a signed security challenge from the client device, the signed security challenge comprising the security challenge signed with the private key, wherein the passkey login also comprises generating and submitting a redirect request to the PSPB (130), the redirect request including the platform header, wherein the redirect request invokes the PSPB (130) to send a passkey public key authentication request to the client frontend app (111*a*), wherein the client frontend authenticates the user by signing the challenge using the private key generated by the passkey generator-and-authenticator as implemented through the native SDK of the native mobile OS, and wherein the client frontend app (111*a*) transmits the signed security challenge to the PSPB (130), and authenticating the client device by verifying the signed security challenge with the public key, wherein the signed security challenge is verified by the public key as generated by the passkey generator-and-authenticator as implemented through the native SDK of the native mobile OS, and providing an authentication token to the client device, the authentication token authenticating the client device to initiate a secure session with a secure resource on the computer network (120).

Additional Considerations

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A security registration and authentication system configured to extend OpenID security standards for registration of OpenID client devices for passkey authentication, the security registration and authentication system comprising:
   a registration and authentication server comprising a server memory and a server processor;
   a set of client computing instructions comprising a client frontend application (app) configured for storage on a client memory of a client device, and to be executed by a client processor of the client device; and
   a set of server computing instructions comprising a client backend app configured for storage on the server memory, and the set of server computing instructions configured for networked communication via a computer network with the set of client computing instructions,
   wherein the set of server computing instructions of the client backend app, when executed by the server processor, causes the server processor to:
      receive an authorization request of the client device comprising a prompt parameter, and implementing one of: (a) a secure registration algorithm if the prompt parameter defines a create value; or (b) an authentication algorithm if the prompt parameter does not define the create value,
      wherein the secure registration algorithm comprises:
         verifying a digital signature of the client device,
         detecting a type of the client device,
         invoking passkey registration, according to the type of the client device, to generate a passkey for the client device, the passkey comprising a public-private key pair having a public key and a private key, and the passkey registration comprising sending a request to register a user of the client device at a passkey service provider backend (PSPB),
         saving, in a memory of the PSPB, the public key, and saving, in the client memory, the private key,
      wherein the authentication algorithm comprises:
         detecting the type of the client device,
         invoking a passkey login, according to the type of the client device, comprising invoking the PSPB to send a security challenge and to receive in response a signed security challenge from the client device, the signed security challenge comprising the security challenge signed with the private key, and
         authenticating the client device by verifying the signed security challenge with the public key, and
      provide an authentication token to the client device, the authentication token authenticating the client device to initiate a secure session with a secure resource on the computer network.

2. The security registration and authentication system of claim 1, wherein the type of client device is a mobile client device implementing a native mobile operating system (OS) configured to execute or interact with the client frontend app, the set of client computing instructions of the client frontend app generated by a native software development kit (SDK) corresponding to the native mobile OS, and
   wherein the secure registration algorithm further comprises:
      receiving from the client frontend app a platform header that identifies the client device as a type of mobile client device,
      generating and submitting a redirect request to the PSPB, the redirect request including the platform header, wherein the redirect request invokes the PSPB to send a passkey generation request to the client frontend app, wherein the client frontend app generates the passkey using a passkey generator-and-authenticator as implemented through the native SDK of the native mobile OS, and
      wherein the client frontend app transmits the public key to the PSPB;
   wherein the authentication algorithm further comprises:
      receiving from the client frontend app a platform header that identifies the client device as a type of mobile client device,
      generating and submitting a redirect request to the PSPB, the redirect request including the platform header, wherein the redirect request invokes the PSPB to send the security challenge to the client frontend app, wherein the client frontend authenticates the user by signing the challenge using the private key generate by the passkey generator-and-authenticator as implemented through the native SDK of the native mobile OS,
      wherein the client frontend app transmits the signed security challenge to the PSPB, and
      wherein the signed security challenge is verified by the public key as generated by the passkey generator-and-authenticator as implemented through the native SDK of the native mobile OS.

3. The security registration and authentication system of claim 2, wherein the passkey generator-and-authenticator collects biometric data of the user, and wherein a first set of biometric data of the user is used to generate the passkey during the execution of the secure registration algorithm, and wherein a second set of biometric data is used to authenticate the user during execution of the authentication algorithm.

4. The security registration and authentication system of claim 1, wherein the type of client device is a computing device implementing a web browser.

5. The security registration and authentication system of claim 1, wherein the authorization request of the client device comprising the prompt parameter is secured against forgeries by:
   generating, by the client backend app, a signature value by signing the authorization request with a shared client secret value as shared between the client backend app and PSPB,
   receiving, by the PSPB, the authorization request,
   looking up, by the PSPB, a client identifier (ID) of the client device corresponding to the client backend app, and
   verifying, by the PSPB, the signature value with the shared client secret value.

6. The security registration and authentication system of claim 1, wherein the authorization request of the client device comprising the prompt parameter is secured against forgeries by:
   generating a signed request object based on the prompt parameter, passing the signed request object as a JavaScript object notation (JSON) web token using a second private key,
wherein the second private key comprises an asymmetric key corresponding to a second public key of the client backend app, and
wherein the second public key is registered with and is accessible to the PSPB for verifying the JSON web token.

7. A security registration and authentication method for extending OpenID security standards for registration of OpenID client devices for passkey authentication, the security registration and authentication method comprising:
receiving, by a client backend app executing on a registration and authentication server, server memory, an authorization request comprising a prompt parameter from a client device, wherein client device comprises client memory storing a set of client computing instructions comprising a client frontend application (app) executing on a client processor of the client device, and
wherein the authorization request is received via a computer network and causes the client backend app to implement one of: (a) a secure registration algorithm if the prompt parameter defines a create value; or (b) an authentication algorithm if the prompt parameter does not define the create value,
wherein the secure registration algorithm comprises:
verifying a digital signature of the client device,
detecting a type of the client device,
invoking passkey registration, according to the type of the client device, to generate a passkey for the client device, the passkey comprising a public-private key pair having a public key and a private key, and the passkey registration comprising sending a request to register a user of the client device at a passkey service provider backend (PSPB),
saving, in a memory of the PSPB, the public key, and
saving, in the client memory, the private key,
wherein the authentication algorithm comprises:
detecting the type of the client device,
invoking a passkey login, according to the type of the client device, comprising invoking the PSPB to send a security challenge and to receive in response a signed security challenge from the client device, the signed security challenge comprising the security challenge signed with the private key, and
authenticating the client device by verifying the signed security challenge with the public key, and
providing an authentication token to the client device, the authentication token authenticating the client device to initiate a secure session with a secure resource on the computer network.

8. The security registration and authentication method of claim 7, wherein the type of client device is a mobile client device implementing a native mobile operating system (OS) configured to execute or interact with the client frontend app, the set of client computing instructions of the client frontend app generated by a native software development kit (SDK) corresponding to the native mobile OS, and
wherein the secure registration algorithm further comprises:
receiving from the client frontend app a platform header that identifies the client device as a type of mobile client device,
generate and submit a redirect request to the PSPB, the redirect request including the platform header, wherein the redirect request invokes the PSPB to send a passkey generation request to the client frontend app, wherein the client frontend app generates the passkey using a passkey generator-and-authenticator as implemented through the native SDK of the native mobile OS, and
wherein the client frontend app transmits the public key to the PSPB;
wherein the authentication algorithm further comprises:
receiving from the client frontend app a platform header that identifies the client device as a type of mobile client device,
generate and submit a redirect request to the PSPB, the redirect request including the platform header, wherein the redirect request invokes the PSPB to send the security challenge to the client frontend app, wherein the client frontend authenticates the user by signing the challenge using the private key generated by the passkey generator-and-authenticator as implemented through the native SDK of the native mobile OS,
wherein the client frontend app transmits the signed security challenge to the PSPB, and
wherein the signed security challenge is verified by the public key as generated by the passkey generator-and-authenticator as implemented through the native SDK of the native mobile OS.

9. The security registration and authentication method of claim 8, wherein the passkey generator-and-authenticator collects biometric data of the user, and wherein a first set of biometric data of the user is used to generate the passkey during the execution of the secure registration algorithm, and wherein a second set of biometric data is used to authenticate the user during execution of the authentication algorithm.

10. The security registration and authentication method of claim 7, wherein the type of client device is a computing device implementing a web browser.

11. The security registration and authentication method of claim 7, wherein the authorization request of the client device comprising the prompt parameter is secured against forgeries by:
generating, by the client backend app, a signature value by signing the authorization request with a shared client secret value as shared between the client backend app and PSPB,
receiving, by the PSPB, the authorization request,
looking up, by the PSPB, a client identifier (ID) of the client device corresponding to the client backend app, and
verifying, by the PSPB, the signature value with the shared client secret value.

12. The security registration and authentication method of claim 7, wherein the authorization request of the client device comprising the prompt parameter is secured against forgeries by:
generating a signed request object based on the prompt parameter,
passing the signed request object as a JavaScript object notation (JSON) web token using a second private key,
wherein the second private key comprises an asymmetric key corresponding to a second public key of the client backend app, and
wherein the second public key is registered with and is accessible to the PSPB for verifying the JSON web token.

13. A tangible, non-transitory computer-readable medium storing instructions of a client backend application (app) for extending OpenID security standards for registration of OpenID client devices for passkey authentication, that when executed by one or more processors cause the one or more processors to:

receive, by a client backend app executing on a registration and authentication server, server memory, an authorization request comprising a prompt parameter from a client device, wherein client device comprises client memory storing a set of client computing instructions comprising a client frontend application (app) executing on a client processor of the client device, and wherein the authorization request is received via a computer network and causes the client backend app to implement one of: (a) a secure registration algorithm if the prompt parameter defines a create value; or (b) an authentication algorithm if the prompt parameter does not define the create value, wherein the secure registration algorithm comprises:
verifying a digital signature of the client device,
detecting a type of the client device,
invoking passkey registration, according to the type of the client device, to generate a passkey for the client device, the passkey comprising a public-private key pair having a public key and a private key, and the passkey registration comprising sending a request to register a user of the client device at a passkey service provider backend (PSPB),
saving, in a memory of the PSPB, the public key, and saving, in the client memory, the private key, wherein the authentication algorithm comprises:
detecting the type of the client device,
invoking a passkey login, according to the type of the client device, comprising invoking the PSPB to send a security challenge and to receive in response a signed security challenge from the client device, the signed security challenge comprising the security challenge signed with the private key, and
authenticating the client device by verifying the signed security challenge with the public key, and provide an authentication token to the client device, the authentication token authenticating the client device to initiate a secure session with a secure resource on the computer network.

14. The tangible, non-transitory computer-readable medium of claim 13, wherein the type of client device is a mobile client device implementing a native mobile operating system (OS) configured to execute or interact with the client frontend app, the set of client computing instructions of the client frontend app generated by a native software development kit (SDK) corresponding to the native mobile OS, and wherein the secure registration algorithm further comprises:
receiving from the client frontend app a platform header that identifies the client device as a type of mobile client device,
generating and submitting a redirect request to the PSPB, the redirect request including the platform header, wherein the redirect request invokes the PSPB to send a passkey generation request to the client frontend app, wherein the client frontend app generates the passkey using a passkey generator-and-authenticator as implemented through the native SDK of the native mobile OS, and
wherein the client frontend app transmits the public key to the PSPB;

wherein the authentication algorithm further comprises:
receiving from the client frontend app a platform header that identifies the client device as a type of mobile client device,
generating and submitting a redirect request to the PSPB, the redirect request including the platform header, wherein the redirect request invokes the PSPB to send the security challenge to the client frontend app, wherein the client frontend authenticates the user by signing the challenge using the private key generated by the passkey generator-and-authenticator as implemented through the native SDK of the native mobile OS,
wherein the client frontend app transmits the signed security challenge to the PSPB, and
wherein the signed security challenge is verified by the public key as generated by the passkey generator-and-authenticator as implemented through the native SDK of the native mobile OS.

15. The tangible, non-transitory computer-readable medium of claim 14, wherein the passkey generator-and-authenticator collects biometric data of the user, and wherein a first set of biometric data of the user is used to generate the passkey during the execution of the secure registration algorithm, and wherein a second set of biometric data is used to authenticate the user during execution of the authentication algorithm.

16. The tangible, non-transitory computer-readable medium of claim 13, wherein the type of client device is a computing device implementing a web browser.

17. The tangible, non-transitory computer-readable medium of claim 13, wherein the authorization request of the client device comprising the prompt parameter is secured against forgeries by:
generating, by the client backend app, a signature value by signing the authorization request with a shared client secret value as shared between the client backend app and PSPB,
receiving, by the PSPB, the authorization request,
looking up, by the PSPB, a client identifier (ID) of the client device corresponding to the client backend app, and
verifying, by the PSPB, the signature value with the shared client secret value.

18. The tangible, non-transitory computer-readable medium of claim 13, wherein the authorization request of the client device comprising the prompt parameter is secured against forgeries by:
generating a signed request object based on the prompt parameter,
passing the signed request object as a JavaScript object notation (JSON) web token using a second private key,
wherein the second private key comprises an asymmetric key corresponding to a second public key of the client backend application, and
wherein the second public key is registered with and is accessible to the PSPB for verifying the JSON web token.

19. A security registration and authentication system configured to extend OpenID security standards for registration of OpenID client devices for passkey authentication, the security registration and authentication system comprising:
a registration and authentication server comprising a server memory and a server processor;
a set of client computing instructions comprising a client frontend application (app) configured for storage on a client memory of a client device, and to be executed by a client processor of the client device, wherein a type of the client device is a mobile client device implementing a native mobile operating system (OS) configured to execute or interact with the client frontend app, the set of client computing instructions of the client frontend app generated by a native software development kit (SDK) corresponding to the native mobile OS; and a set of server computing instructions comprising a client backend app configured for storage on the server memory, and the set of server computing instructions configured for networked communication via a computer network with the set of client computing instructions, wherein the set of server computing instructions of the client backend app, when executed by the server processor, causes the server processor to:

receive an authorization request of the client device comprising a prompt parameter, and implementing one of: (a) a secure registration algorithm if the prompt parameter defines a create value; or (b) an authentication algorithm if the prompt parameter does not define the create value, wherein the secure registration algorithm comprises:
verifying a digital signature of the client device,
receiving from the client frontend app a platform header that identifies the client device as a type of mobile client device,
detecting that the type of the client device is a mobile client device,
invoking passkey registration, for the mobile client device, to generate a passkey for the client device, the passkey comprising a public-private key pair having a public key and a private key, and the passkey registration comprising sending a request to register a user of the client device at a passkey service provider backend (PSPB), wherein the passkey registration also comprises generating and submitting a redirect request to the PSPB, the redirect request including the platform header, wherein the redirect request invokes the PSPB to send a security challenge to the client frontend app, wherein the client frontend app generates the passkey using a passkey generator-and-authenticator as implemented through the native SDK of the native mobile OS, wherein the client frontend app transmits the public key to the PSPB,
saving, in a memory of the PSPB, the public key, and saving, in the client memory, the private key, wherein the authentication algorithm comprises:
receiving from the client frontend app a platform header that identifies the client device as a type of mobile client device,
detecting that the type of the client device is a mobile client device,
invoking a passkey login, for the mobile client device, comprising invoking the PSPB to send the security challenge and to receive in response a signed security challenge from the client device, the signed security challenge comprising the security challenge signed with the private key, wherein the passkey login also comprises generating and submitting a redirect request to the PSPB, the redirect request including the platform header, wherein the redirect request invokes the PSPB to send a passkey public key authentication request to the client frontend app, wherein the client frontend authenticates the user by signing the challenge using the private key generated by the passkey generator-and-authenticator as implemented through the native SDK of the native mobile OS, and wherein the client frontend app transmits the signed security challenge to the PSPB, and
authenticating the client device by verifying the signed security challenge with the public key, wherein the signed security challenge is verified by the public key as generated by the passkey generator-and-authenticator as implemented through the native SDK of the native mobile OS, and providing an authentication token to the client device, the authentication token authenticating the client device to initiate a secure session with a secure resource on the computer network.

* * * * *